(12) United States Patent
Cramer

(10) Patent No.: US 12,386,105 B2
(45) Date of Patent: Aug. 12, 2025

(54) SYSTEM AND METHODS FOR LASER SCATTERING, DEVIATION AND MANIPULATION

(71) Applicant: Hyperstealth Biotechnology Corporation, Maple Ridge (CA)

(72) Inventor: Guy Cramer, Maple Ridge (CA)

(73) Assignee: Hyperstealth Biotechnology Corporation

( * ) Notice: Subject to any disclaimer, the term of this patent is extended or adjusted under 35 U.S.C. 154(b) by 1077 days.

(21) Appl. No.: 17/276,780

(22) PCT Filed: Jun. 26, 2019

(86) PCT No.: PCT/CA2019/000097
§ 371 (c)(1),
(2) Date: Mar. 16, 2021

(87) PCT Pub. No.: WO2020/056484
PCT Pub. Date: Mar. 26, 2020

(65) Prior Publication Data
US 2022/0035078 A1 Feb. 3, 2022

Related U.S. Application Data

(60) Provisional application No. 62/732,240, filed on Sep. 17, 2018.

(30) Foreign Application Priority Data

Feb. 13, 2019 (WO) ................. PCT/CA2019/000019

(51) Int. Cl.
*G02B 5/18* (2006.01)
*G01S 7/481* (2006.01)
(Continued)

(52) U.S. Cl.
CPC .............. *G02B 3/005* (2013.01); *G01S 7/481* (2013.01); *G02B 5/1866* (2013.01);
(Continued)

(58) Field of Classification Search
CPC ............ G02B 27/0905; G02B 27/0966; G02B 27/0961; G02B 27/0944; G02B 3/005;
(Continued)

(56) References Cited

U.S. PATENT DOCUMENTS 4,336,978 A * 6/1982 Suzuki ..................... G02B 3/00
359/619
4,509,823 A * 4/1985 Moriguchi ........... G03B 21/625
359/457
(Continued)

FOREIGN PATENT DOCUMENTS

JP H10253916 A 9/1998

*Primary Examiner* — Sang H Nguyen
(74) *Attorney, Agent, or Firm* — McMillan LLP

(57) ABSTRACT

Systems and methods for scattering or deviating a laser beam are provided. A system utilizing a lenticular sheet and a laser source projecting a laser beam onto the lenticular sheet produces shapes such as laser cones. Minor adjustments of the laser source with respect to the lenticular sheet may vary the size and shape of the laser cone that provides for improved Light Detection and Ranging (LIDAR) systems. A diffraction grating added in the path of the laser beam causes a laser pattern of a matrix of lines to be produced which also provides for improved. Interference between multiple lenticular sheets may be used to deviate a laser beam to protect military assets from laser-guided projectiles and/or laser acquisition.

16 Claims, 29 Drawing Sheets

(51) Int. Cl.
*G02B 3/00* (2006.01)
*G02B 27/09* (2006.01)
(52) U.S. Cl.
CPC ..... *G02B 27/0944* (2013.01); *G02B 27/0961* (2013.01); *G02B 27/0966* (2013.01)
(58) Field of Classification Search
CPC ... G02B 5/1866; G02B 3/0062; G01S 7/4814; G01S 7/481; G01S 7/4817; F41H 3/00
See application file for complete search history.

(56) References Cited

U.S. PATENT DOCUMENTS

| | | | | |
|---|---|---|---|---|
| 6,185,038 | B1 * | 2/2001 | Yamaguchi | G03B 21/625 359/457 |
| 6,282,034 | B1 * | 8/2001 | Onishi | G02B 3/08 359/566 |
| 6,310,722 | B1 * | 10/2001 | Baek | G03B 21/625 359/455 |
| 6,762,883 | B2 * | 7/2004 | Yoshida | G03B 21/625 359/623 |
| 8,408,775 | B1 * | 4/2013 | Coleman | G02F 1/133526 362/616 |
| 2002/0149846 | A1 * | 10/2002 | Goto | G03B 21/625 359/456 |
| 2003/0063390 | A1 | 4/2003 | Brown | |
| 2009/0147365 | A1 * | 6/2009 | Inokuma | G02B 3/005 359/599 |
| 2010/0266268 | A1 | 10/2010 | Jennings et al. | |
| 2010/0328773 | A1 | 12/2010 | Chen et al. | |
| 2017/0272739 | A1 * | 9/2017 | Kroon | H04N 13/315 |

* cited by examiner

SYSTEM AND METHODS FOR LASER SCATTERING, DEVIATION AND MANIPULATION

FIELD OF THE INVENTION

The present invention relates generally to manipulation of light rays, and more specifically to a system and methods for laser scattering, deviation, and manipulation.

BACKGROUND OF THE INVENTION

Laser stands for "light amplification by stimulated emission of radiation". A laser differs from other sources of light in that it emits light coherently, both spatially and temporally. Spatial coherence allows a laser to be focused to a tight spot, enabling applications such as laser cutting and lithography. Spatial coherence also allows a laser beam to stay narrow over great distances (collimation), enabling applications such as laser pointers. Lasers can also have high temporal coherence, which allows them to emit light with a very narrow spectrum, i.e., they can emit a single color of light. Temporal coherence can be used to produce pulses of light as short as a femtosecond.

A lenticular sheet is a translucent plastic sheet, made by distinctive and precise extrusion with a series of vertically aligned, plano-convex, cylindrical lenses called lenticules on one side and a flat surface on the other side. The lenticules help transform a 2D image into a variety of visual illusions wherein a viewer may see lenticular special effects when the orientation of a lenticular sheet is changed. A lenticular sheet may be made from acrylic, APET, PETG, polycarbonate, polypropylene, PVC or polystyrene. Each of those different materials has a different level of sensitivity to temperature and UV light.

An important characteristic of a lenticular sheet is the density of lenses. The density of lenses is expressed as a lens-per-inch or lenticules-per-inch (LPI). The thickness of a lenticular sheet is usually but not always reversely correlated to the LPI; the lower the LPI the thicker the lenticular sheet is. Another important characteristic of a lenticular sheet is the viewing angle. The viewing angle of a lenticular sheet is a v-shaped region within which lenticular images may be viewed clearly.

A diffraction grating is a plate of glass, plastic or metal ruled with very dose parallel lines, producing a spectrum by diffraction and interference of light. A diffraction grating is an optical component with a periodic structure that splits and diffracts light into several beams travelling in different directions. The emerging coloration is a form of structural coloration. The directions of the beams depend on the spacing of the grating and the wavelength of the light so that the grating acts as the dispersive element. Holographic diffraction gratings are highly efficient embossed Holographic Optical Elements (HOE). Diffraction gratings are used for the direct viewing and analysis of spectra from different gas tubes and other light sources. The pattern size, measured in number of lines per inch or lines per mm (millimeter), is an important characteristic of a diffraction grating. Some diffraction gratings have 13,500 lines per inch. A single axis diffraction grating has a plurality of parallel lines. A double axis diffraction grating has a first plurality of parallel lines and a second plurality of parallel lines perpendicular to the first plurality of parallel lines. Diffraction gratings are used in experiments pertaining to the study of light and color.

LiDAR (Light Detection And Ranging) is a laser-based remote sensing technology. The theory behind LiDAR is to point a laser beam at a surface and measure the time it takes the laser to strike an object. An optical sensor typically at or near the laser source detects these strikes. Then knowing that laser travels at the speed of light, the distance to the detected surface can be determined by multiplying the speed of light by the detection time and then dividing by two. A LIDAR system thus utilizes at least one laser source and at least one sensor. A LiDAR system may be ground-based, water-based, space-based or mounted on an airplane, a car, or a UAV (unmanned aerial vehicle).

SUMMARY

In one aspect of the present disclosure, there is provided a system for diverting a laser beam. The system comprises a laser source emitting an incident laser beam comprising a plurality of rays projecting as a dot, and a lenticular sheet having a lens side comprising a plurality of parallel longitudinal lenticular lenses and a smooth side opposite the lens side. The laser source is aimed towards the lens side of the lenticular sheet such that the incident laser beam falls onto at least one of the plurality of parallel longitudinal lenticular lenses. A first portion of the plurality of rays of the incident laser beam is diverted by refraction to form a refracted beam of a first shape. A second portion of the plurality of rays of the incident laser beam is reflected by a surface of the at least one of the plurality of parallel longitudinal lenticular lenses to form a reflected beam of a second particular shape.

In one embodiment, the laser source is aimed so that the first incident laser beam falls perpendicularly onto the at least one of the plurality of parallel longitudinal lenticular lenses, the first portion of the incident the laser beam diverted by refraction represents a majority of the plurality of rays of the incident laser beam, and the refracted beam of the first particular shape is in the form of a triangular plane beam projected as a straight line.

In one embodiment, the lenticular sheet is placed in an upright position such that the plurality of parallel longitudinal lenses are oriented horizontally, the triangular plane beam is vertically oriented, and the projected straight line is vertical.

In one embodiment, the lenticular sheet is placed in an upright position such that the plurality of parallel longitudinal lenticular lenses are oriented vertically, the triangular plane beam is horizontally oriented, and the projected straight line is horizontal.

In one embodiment, the laser source is aimed so that the incident laser beam falls at an angle of incidence to a perpendicular direction onto the at least one of the plurality of parallel longitudinal lenticular lenses such that the first portion of the plurality of rays of the first incident laser beam diverted by refraction represents a majority of the plurality of rays of the first incident laser beam, the first incident laser beam is in the same plane as a horizontal plane passing through the at least one of the plurality of parallel longitudinal lenticular lenses, and the refracted beam of a particular shape is in the form of a curved plane projected as an arc.

In one embodiment, the laser source is aimed so that the first incident laser beam falls at an incident angle off of a perpendicular direction onto the at least one of the plurality of parallel longitudinal lenticular lenses such that the first and second portions together form a cone projecting to a circle.

In one embodiment, the lens side of the lenticular sheet is coated with reflective material such that the second portion of the plurality of rays reflected by the surface of the at least one of the plurality of longitudinal lenticular lenses comprises all of the plurality of rays of the incident laser beam.

In one embodiment, an anti-reflective layer or coating is disposed on at least one of the lens side and the smooth side of the lenticular sheet for reducing the second portion of the plurality of rays of the incident laser beam which is reflected by the surface of the at least one of the plurality of longitudinal lenticular lenses.

In one embodiment, the system further comprises at least one diffraction grating positioned between the laser source and the lenticular sheet such that the incident laser beam passes through the diffraction grating before passing through the lenticular sheet.

In one embodiment, the system further comprises at least one diffraction grating positioned behind the lenticular sheet such that the incident laser beam passes through the diffraction grating after passing through the lenticular sheet.

In one embodiment, the lenticular sheet is placed in an upright position such that the plurality of parallel longitudinal lenses are oriented horizontally, and the at least one diffraction grating comprises at least one linear diffraction grating oriented such that a plurality of lines thereof are vertically oriented.

In one embodiment, the lenticular sheet is placed in an upright position such that the plurality of parallel longitudinal lenses are oriented at an angle to the horizontal plane, and the at least one diffraction grating comprises at least one linear diffraction grating oriented such that a plurality of lines thereof are vertically oriented.

In one embodiment, the lenticular sheet is placed in an upright position such that the plurality of parallel longitudinal lenses are oriented horizontally, and the at least one diffraction grating comprises at least one dual-axis diffraction grating oriented such that a first plurality of lines thereof are vertically oriented, and a second plurality of lines thereof are horizontally oriented.

In one embodiment, the lenticular sheet is placed in an upright position such that the plurality of parallel longitudinal lenses are oriented at an angle to the horizontal plane, and the at least one diffraction grating comprises at least one dual-axis diffraction grating oriented such that a first plurality of lines thereof are vertically oriented, and a second plurality of lines thereof are horizontally oriented.

In another aspect of the present disclosure, there is provided a system for manipulating two laser beams to form a cone. The system comprises a first laser source producing a first incident beam comprised of a plurality of rays projecting to a dot, a second laser source producing a second incident beam comprised of a plurality of rays projecting to a dot, and a double-sided lenticular sheet having a first lens side comprising a plurality of parallel longitudinal lenticular lenses and a second lens side comprising a plurality of parallel longitudinal lenticular lenses opposite the first lens side. The first laser source is directed towards the first side of the lenticular sheet so that the first incident beam falls onto one of the plurality of parallel longitudinal lenticular lenses at an incident angle such that the majority of the first incident beam rays are reflected forming a first curved plane. The second laser source is directed towards the second side of the lenticular sheet so that the second incident beam falls onto an opposite side of the one of the plurality of parallel longitudinal lenticular lenses at the same incident angle as the first laser source such that the majority of the second incident beam rays are refracted forming a second curved plane. The first and second curved planes together form a cone projected as a circle.

In one embodiment, the double-sided lenticular sheet comprises a first and a second single-sided lenticular sheet each having a lens side and a smooth side, and wherein the first and second single-sided lenticular sheets are positioned back-to-back at their respective smooth sides.

In one embodiment, the system further comprises a sheet of bright opaque material disposed between the respective smooth sides of the first and second single-sided lenticular sheets.

In one embodiment, the sheet of bright opaque material comprises a double-sided mirror.

In one embodiment, the first lens side and the second lens side are coated with or made of reflective material.

In one embodiment, the smooth sides of the first and second sing-sided lenticular sheets are coated with reflective material.

In yet another aspect of the present disclosure there is provided a system for manipulating two laser beams to form a cone. The system comprises a first laser source producing a first incident beam comprised of a plurality of rays projecting to a dot, a second laser source producing a second incident beam comprised of a plurality of rays projecting to a dot, and a lenticular sheet having a first lens side comprising a plurality of parallel longitudinal lenticular lenses and a second lens side comprising a plurality of parallel longitudinal lenticular lenses opposite the first side. The first laser source is directed towards the first side of the lenticular sheet so that the first incident beam falls onto one of the plurality of parallel longitudinal lenticular lenses at a first incident angle such that the first incident beam rays are refracted and reflected to form a first cone. The second laser source is directed towards the second side of the lenticular sheet so that the second incident beam falls onto an opposite side of the one of the plurality of parallel longitudinal lenticular lenses at an incident angle greater than the first incident angle such that the second incident beam rays are refracted and reflected to form a second cone larger than the first cone and coaxial therewith.

In one embodiment, the first and second beams are spaced apart when they fall on the one of the plurality of parallel longitudinal lenticular lenses such that there is a distance between the apex of the first cone and the apex of the second cone.

In yet another aspect of the present disclosure, there is provided a method of detecting at least one object using a light detection and ranging (LIDAR) system. The method comprises projecting a first incident laser beam at a first angle onto a first lens side of a double-sided lenticular sheet for producing a first half cone of reflected rays, projecting a second incident laser beam at a second angle onto a second lens side of the double-sided lenticular sheet for producing a second half cone of reflected rays which, together with the first half cone of reflected rays forms a full cone of reflected rays, and detecting, by at least one sensor of the LIDAR system, signals reflected off at least one object when the at least one object crosses any one of the reflected rays of the full cone.

In one embodiment, the method further comprises varying the first angle and the second angle for changing the size of the first half cone and the second half cone, respectively.

In yet another aspect of the present disclosure, there is provided a system for diverting a laser beam. The system comprises a laser source for projecting an incident laser beam, a first lenticular sheet having a lens side comprising a plurality of parallel longitudinal lenticular lenses and a smooth side opposite the first side, and a second lenticular sheet having a lens side comprising a plurality of parallel longitudinal lenticular lenses and a smooth side opposite the first side. The first and second lenticular sheets are positioned such that the smooth side of the first lenticular sheet faces the smooth side of the second lenticular sheet and the first and second lenticular sheets form a double-sided lenticular sheet. The laser source projects the incident laser beam through the first and second lenticular sheets.

In one embodiment, the second lenticular sheet is positioned such that the plurality of lenticular lenses thereof are parallel to and offset from the plurality of lenticular lenses of the first lenticular sheet so as to cause an interference pattern between the two lenticular sheets for deviating the laser beam.

In one embodiment, the second lenticular sheet is positioned such that the plurality of lenticular lenses thereof are angled to the plurality of lenticular lenses of the first lenticular sheet so as to cause an interference pattern between the two lenticular sheets for deviating the laser beam.

In one embodiment, the system further comprises a double-sided lenticular sheet having a first lens side comprising a plurality of parallel longitudinal lenticular lenses and a second lens side comprising a plurality of parallel longitudinal lenticular lenses opposite the first side, the double-sided lenticular sheet positioned to the front of or behind the first and second lenticular sheets with respect to the laser source.

In one embodiment, the first and second lenticular sheets are integrally formed.

In one embodiment, the first and second lenticular sheets, and the double-sided lenticular sheet are integrally formed.

A method of making a system for deviating a laser beam comprises providing a first lenticular sheet having a lens side comprising a plurality of parallel longitudinal lenticular lenses and a smooth side opposite the first side, providing a second lenticular sheet having a lens side comprising a plurality of parallel longitudinal lenticular lenses and a smooth side opposite the first side, and adhering the smooth side of the first lenticular sheet to the smooth side of the second lenticular sheet.

In one embodiment, the method further comprises, prior to said adhering, positioning the second lenticular sheet such that the plurality of lenticular lenses thereof are parallel to and laterally offset from the plurality of lenticular lenses of the first lenticular sheet.

In one embodiment, the method further comprises, prior to said adhering, positioning the second lenticular sheet such that the plurality of lenticular lenses thereof are angled to the plurality of lenticular lenses of the first lenticular sheet.

In one embodiment, the method further comprises providing a double-sided lenticular sheet having a first lens side comprising a plurality of parallel longitudinal lenticular lenses and a second lens side comprising a plurality of parallel longitudinal lenticular lenses opposite the first side, and adhering the double-sided lenticular sheet to the lens side of the first lenticular sheet or to the lens side of the second lenticular sheet such that the plurality of parallel longitudinal lenticular lenses of the double-sided lenticular sheet are parallel to either the plurality of parallel longitudinal lenticular lenses of the first or second lenticular sheet.

BRIEF DESCRIPTION OF THE DRAWINGS

Embodiments of the present invention will be presented with reference to the accompanying drawings, in which.

DETAILED DESCRIPTION OF THE EMBODIMENTS

Embodiments of the present invention will now be presented by way of example only and not limitation. Utilizing lenticular lenses, the beam path of one or more laser device can be heavily modified to cause the laser beam(s) to turn into a flat plane, a lightly curved plane, a heavily curved plane, or a cone from the point where the beam hits the lenticular lens.

Figure 1:
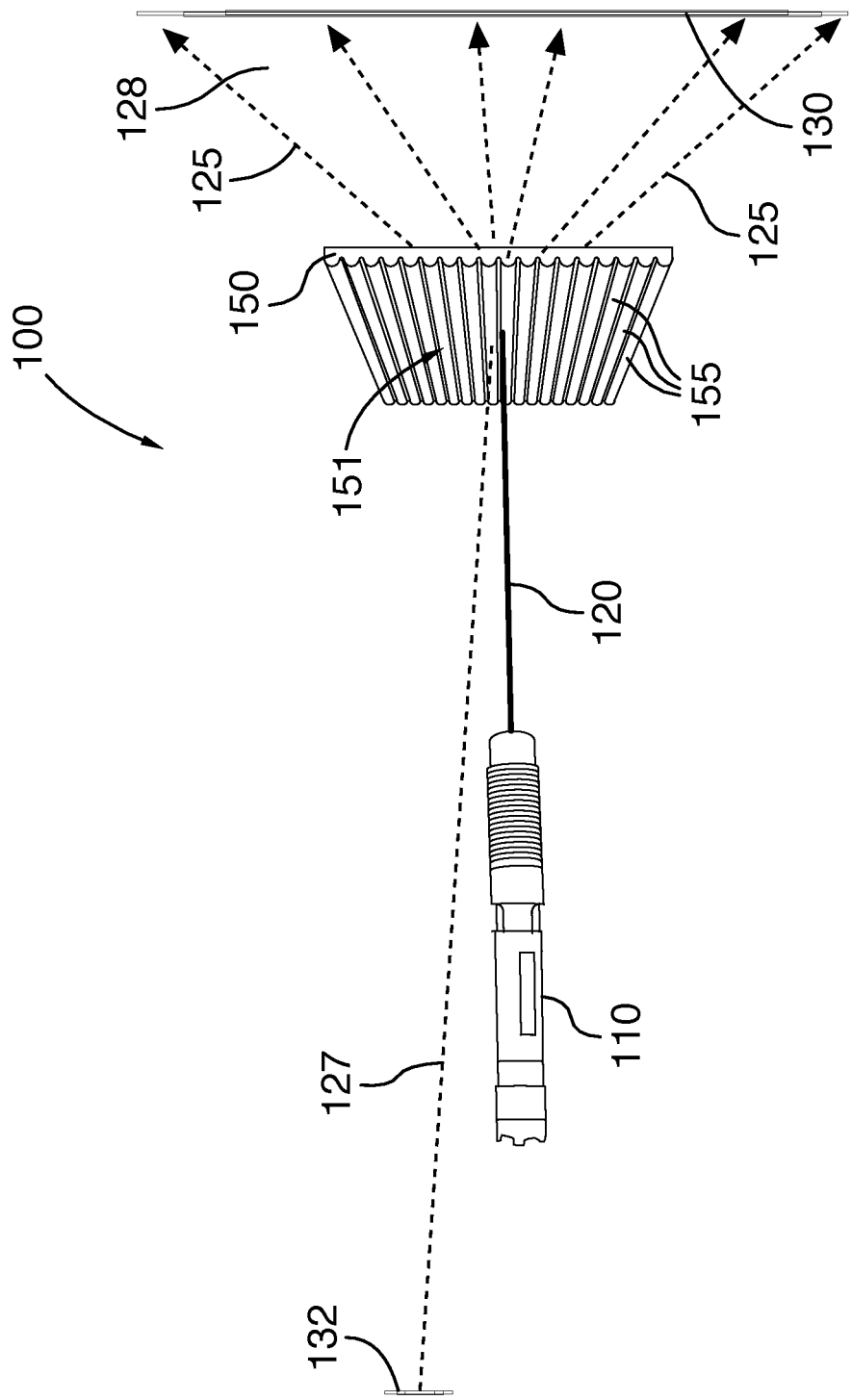
FIG. 1 is a side perspective view of a system for scattering a laser beam aimed generally perpendicularly to a lens side of an upright singled-sided lenticular sheet having horizontally-oriented longitudinal lenticular lenses on the lens side thereof and an opposite smooth side.

With reference to FIG. 1, a system 100 for manipulating a laser beam is depicted. The system 100 includes a laser source 110 that emits an incident laser beam 120 that forms a dot when projected on a surface. The incident laser beam 120 is aimed perpendicularly onto a linear lenticular sheet 150. The linear lenticular sheet 150 has lens side 151, and an opposite smooth side. The lens side 151 of the linear lenticular sheet 150 includes a plurality of longitudinal lenticular lenses 155 oriented in the horizontal direction. The incident laser beam 120 is generally narrow and focused that it projects on a single longitudinal lenticular lens 155, or on a small number of adjacent lenticular lenses 155, on the lens side 151 of lenticular sheet 150. This depends on the density of the lenticular sheet 150, which is measured in lens-per-inch or LPI. For a lenticular sheet with a low lens density, all of the rays of incident laser beam 120 may all fall onto a single longitudinal lenticular lens 155. However, for a lenticular sheet 150 with a high lens density, the rays of the incident laser beam 120 fall onto a plurality of adjacent lenticular lenses 155. The individual rays of the incident laser beam 120 each undergoes refraction at a different angle by the longitudinal lenticular lens or lenses 155. The resulting rays 125 are diverted such that they are spread out and are projected out from the opposite smooth side of the lenticular sheet 150 in the form of a plurality of rays forming a triangular flat plane 128. Upon projecting on a flat surface, the diverted rays 125 form a vertical line pattern 130. The lenticular sheet used in FIG. 1 has a relatively high lens density. A further observation of the line 130 shows that the line 130 is comprised of a plurality of closely spaced dots. A small number of rays 127 of the incident laser beam 120 are reflected off the surface of lenticular lens 155 in the form of a very narrow triangular flat plane. The rays 127 form a small line 132 when projected on a flat surface on the same side as the laser source 110.

Figure 2:
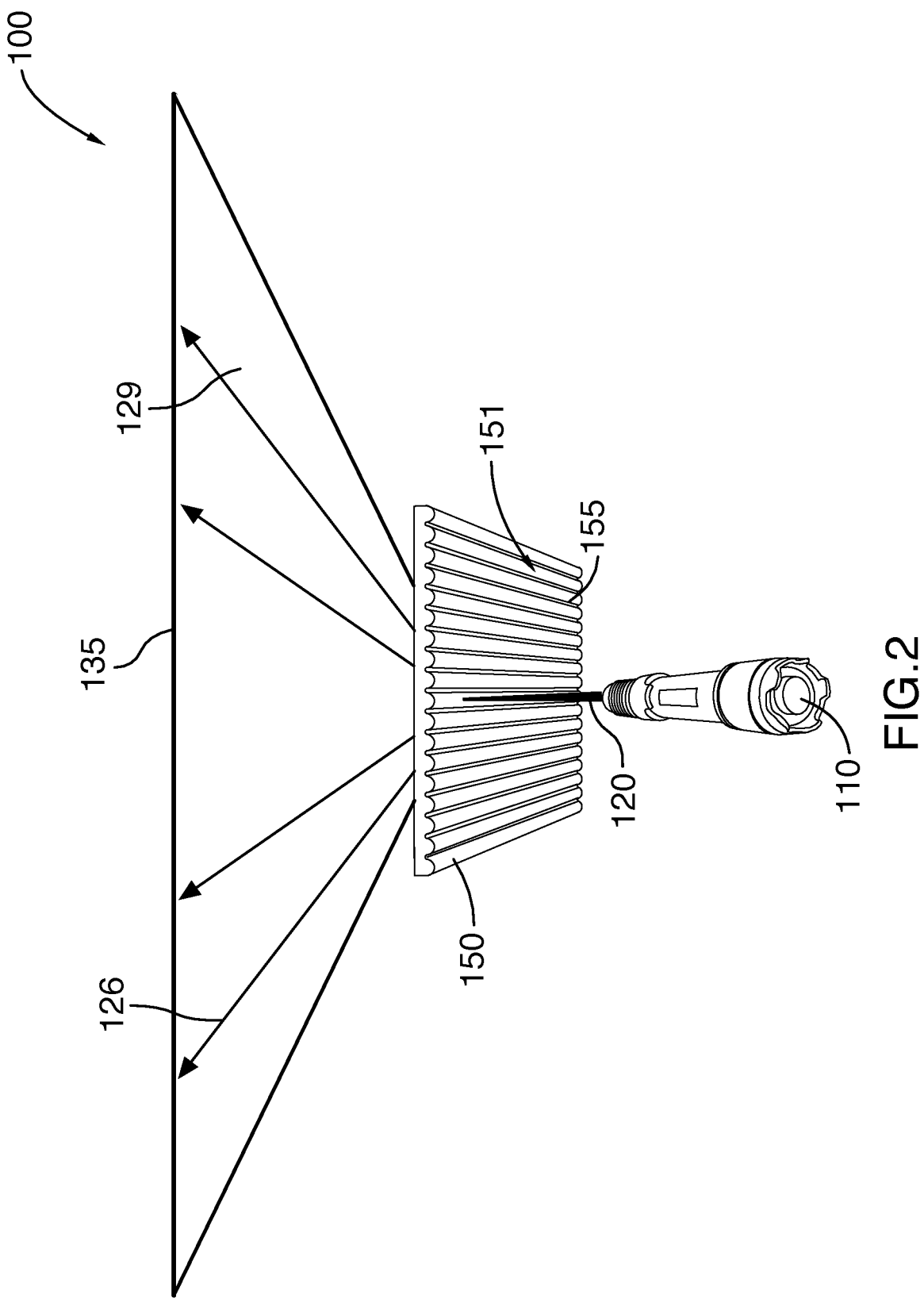
FIG. 2 is a top-front perspective view of a system for scattering a laser beam aimed generally perpendicularly to a lens side of an upright single-sided lenticular sheet having vertically-oriented longitudinal lenticular lenses on the lens side thereof and an opposite smooth side.

The orientation of the line pattern 130 formed by the spreading out of the incident laser beam 120 by refraction of its rays through the longitudinal lenticular lens or lenses 155 depends on the orientation of the longitudinal lenticular lens on lenses 155 on which the incident laser beam 120 is projected. In FIG. 1, the lenticular sheet is oriented such that the lenticular lenses 155 are oriented horizontally and the resulting line pattern 130 is vertical. FIG. 2 depicts a system 100, similar to the system 100 of FIG. 1, except that the lenticular sheet 150 is placed in an upright position and is oriented such that the plurality of longitudinal lenticular lenses 155 are vertically oriented. When laser source 110 projects the incident laser beam 120 onto a vertically oriented longitudinal lenticular lens or lenses 155 of the lenticular sheet 150, the rays of the incident laser beam 120 are refracted by the lenticular lens 155 to produce diverted rays 126 in the form of a triangular flat plane 129. When projected on a flat surface, the rays 126 form a horizontal line 135 pattern behind the smooth side of the lenticular sheet 150. The lenticular sheet 150 used in FIG. 2 has a low lens density, and accordingly the line pattern 135 is shown as a single line. However, similar to line pattern 130, line pattern 135 is comprised of a plurality of closely spaced dots.

Figure 3:
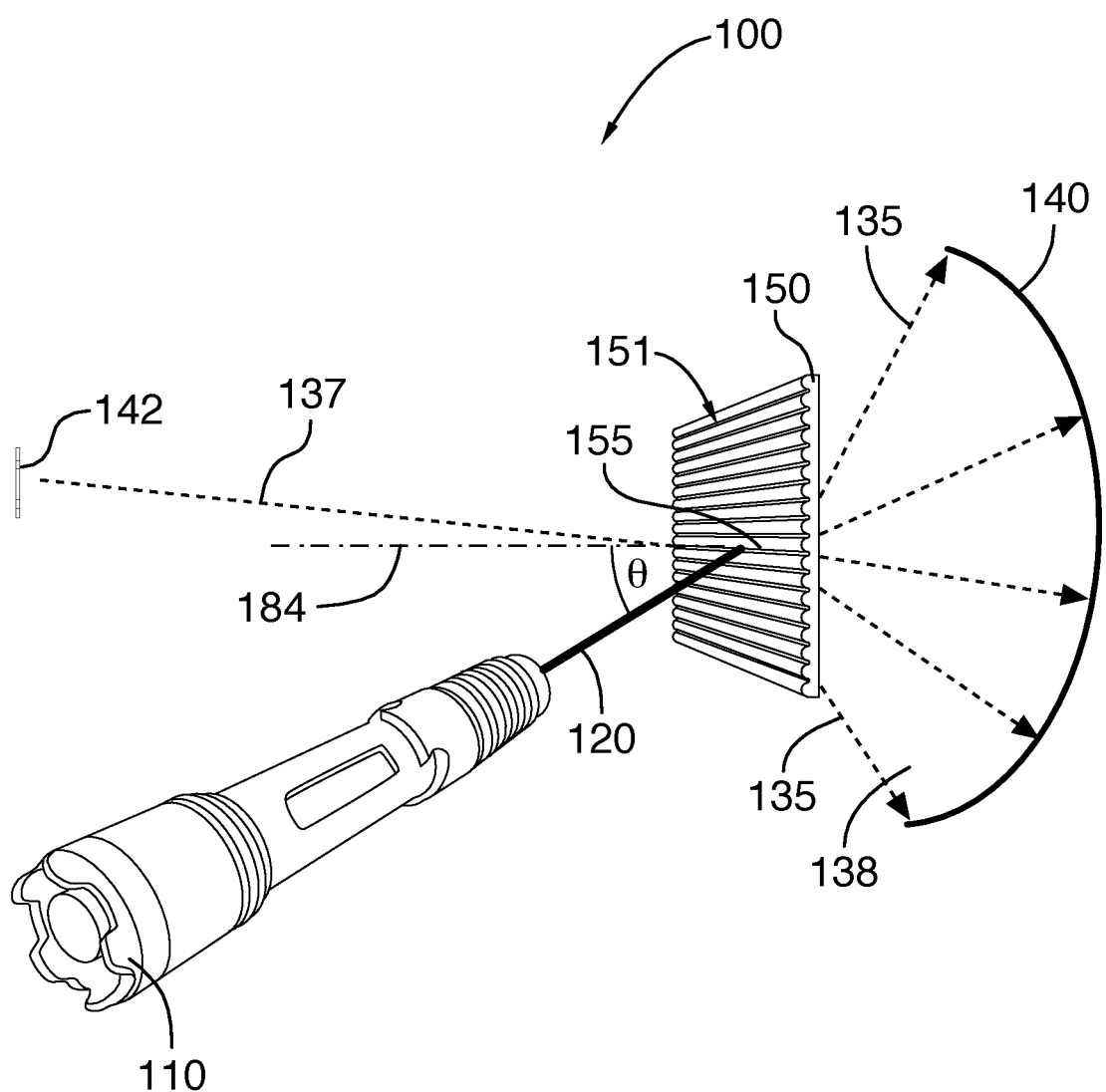
FIG. 3 is a side perspective view of a system for scattering a laser beam aimed at a small angle with respect to the perpendicular to a lens side of an upright single-sided lenticular sheet having horizontally-oriented longitudinal lenticular lenses on the lens side thereof and an opposite smooth side, wherein the laser beam is generally in the same horizontal plane as the longitudinal lenticular lens on which it is projected.

In both FIG. 1 and FIG. 2, the laser beam 120 is perpendicular to the lenticular sheet. Accordingly, the effect of the lenticular lens 155 on the laser beam 120 is symmetrical. FIG. 3 depicts a system 100 for diverting a laser beam 120 similar to that of FIG. 1 with the exception that the laser beam 120 is aimed at the lens side 151 of the lenticular sheet 150 at a horizontal angle of incidence θ relative to the perpendicular direction to the lens side 151 which is depicted by the line 184. The angle of incidence θ is such that the overwhelming majority of the rays of the incident laser beam 120 are refracted by the longitudinal lenticular lens or lenses 155 in the form of the diverted rays 135. Only a small number of rays of the incident laser beam 120 are reflected by the longitudinal lenticular lens or lenses 155 in the form of the reflected rays 137. The incident laser beam 120 is maintained in the horizontal plane passing through lenticular the lens 155 on which it is aimed. The angled orientation of the laser beam 120 with respect to the lenticular lens 155 causes the individual rays of laser beam 120 passing through the lenticular lens 155 to undergo refraction in two different general directions. Due to the curved (convex) shape of the lenticular lens 155, the rays of laser beam 120 tend to be diverted (refracted) in the vertical direction as was seen in FIG. 1. Moreover, due to the angle of incidence θ by which the laser beam 120 is oriented with respect to the direction perpendicular to lenticular lens 155, the individual rays of laser beam 120 tend to be additionally refracted in the horizontal direction. Since the rays of the incident laser beam 120 fall on different regions of the lenticular lens 155 each having a generally different thickness (due to the curvature of the lenticular lens surface), therefore each of the rays of laser beam 120 gets refracted by a different angle in the horizontal direction. As a result, the diverted rays 125 which emerge from the smooth side of the lenticular lens 155 end up taking a shape of a curved plane 138 (in the form of a partial cone) which when falling onto a flat surface projects an arc pattern 140. A minority of the rays of the incident laser beam 120 are reflected off the lens side surface of the lenticular lens 155. The reflected rays 137 form a curved plane on the same side of the lenticular sheet 150 as the laser source 110. When projected on a flat surface the reflected rays 137 projected a small arc 142.

Figure 4:
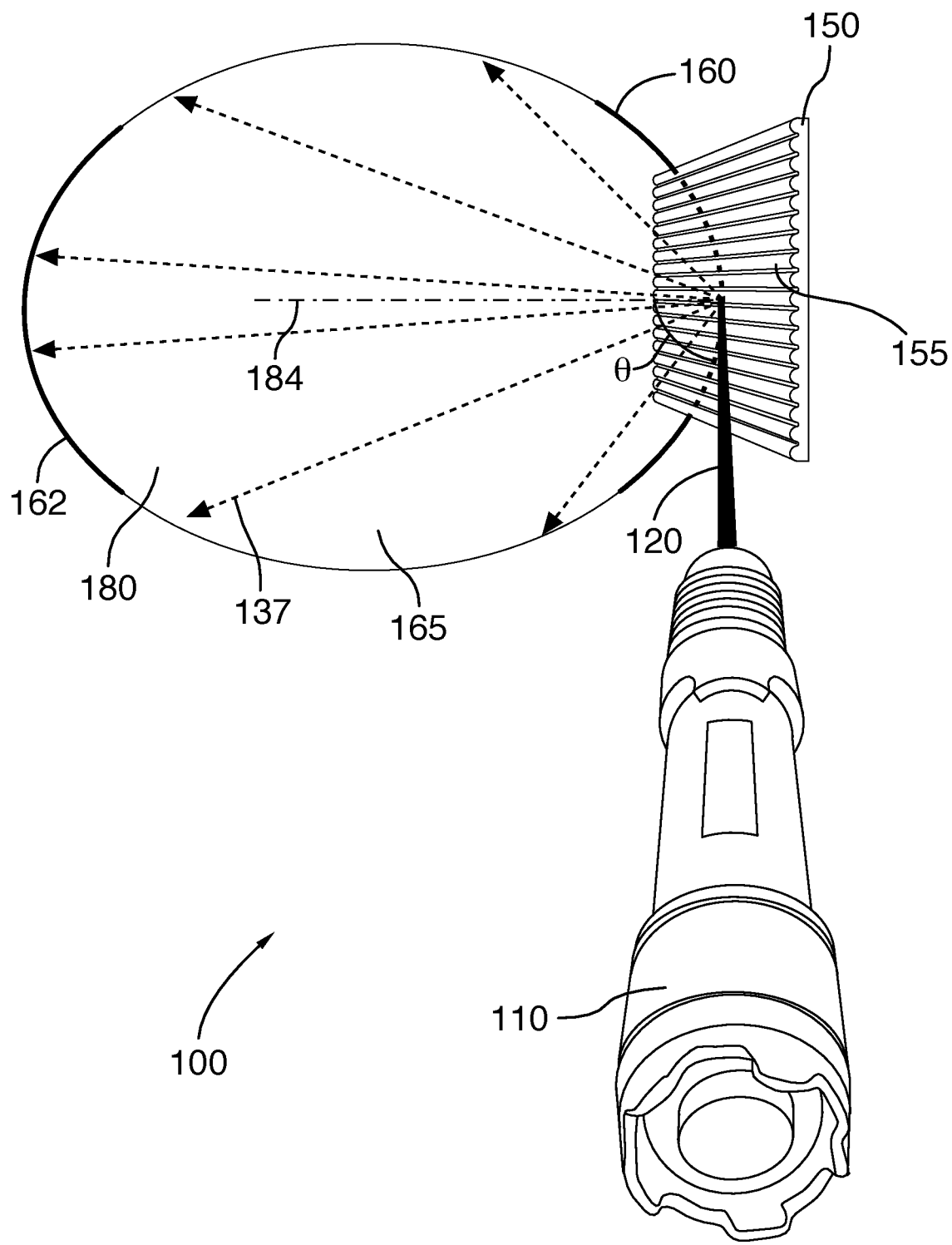
FIG. 4 is a side perspective view of a system for scattering a laser beam aimed at a larger angle than the angle in FIG. 3 with respect to the perpendicular to a lens side of an upright lenticular sheet having horizontally-oriented longitudinal lenticular lenses on the lens side thereof and an opposite smooth side, wherein the laser beam is generally in the same horizontal plane as the longitudinal lenticular lens on which it is projected.

FIG. 4 depicts a system 100 similar to the system of FIG. 3 with the exception that the angle of incidence θ of beam 120 onto lenticular sheet 150, with respect to the perpendicular 184, is greater than that of FIG. 3. When the angle of incidence θ is increased a greater number of the rays of the incident laser beam 120 are reflected off the lens side of the lenticular lens 155 surface and are shown as the reflected rays 137. The reflected rays 137 form a curved plane that projects as an arc 162, which is in the shape of a partial ellipse. The curved plane formed by the reflected rays 137 and the corresponding projected arc 162 are on the same side of lenticular sheet 150 as the laser source 110 to the front of sheet 150. A smaller number of rays, depending on the angle of incidence θ of the incident laser beam 120 with respect to the perpendicular 184, pass through the lenticular lens 155, are refracted in a curved manner as described above, and project an arc 160 behind the lenticular sheet 150. The resulting projected pattern is an ellipse 165 comprised of arcs 160 and 162 complementing one another. The ellipse 165 is a projection of an ellipsoidal cone formed by the reflected rays 137 and the refracted rays. It has been observed that when the lenticular sheet is perpendicular to the surface (e.g. wall) upon which the laser pattern is projected, that the ellipse 165 projects close to a perfect circle, and accordingly, the reflected rays 137 and refracted rays 135 together form a perfect cone, as shown in FIG. 5A.

Figure 5A:
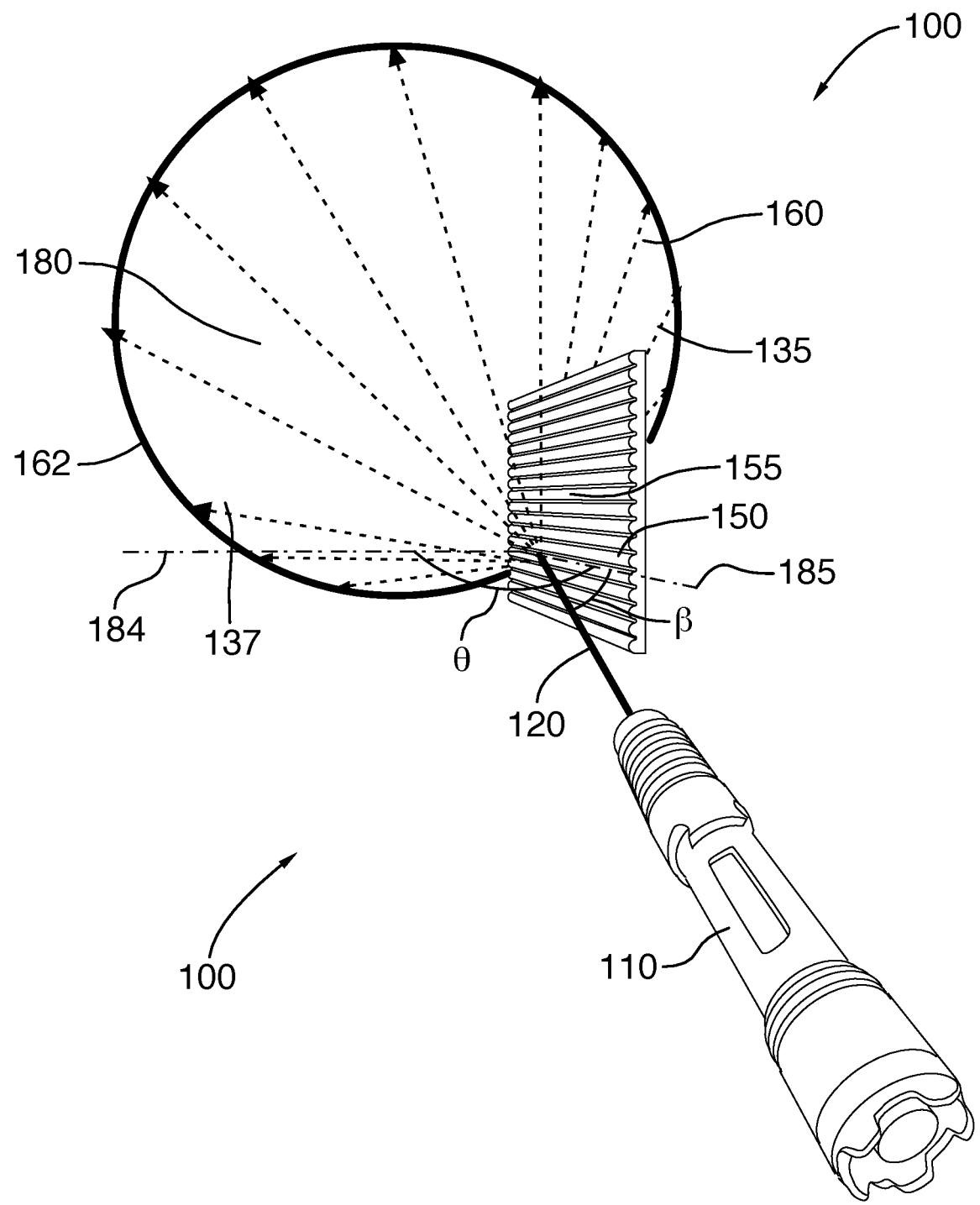
FIG. 5A is a side perspective view of a system for scattering a laser beam aimed at an larger angle but similar to that of FIG. 4 with respect to the perpendicular to a lens side of a single-sided upright lenticular sheet having horizontally-oriented longitudinal lenticular lenses on the lens side thereof and an opposite smooth side, wherein the laser beam forms an angle with the horizontal plane passing through the longitudinal lenticular lens on which it is projected.

FIG. 5A shows a variation on the system 100 of FIG. 4. The incident laser beam 120 has an angle of incidence of θ with respect to a perpendicular direction 184 to the lenticular lens 155 of the lenticular sheet 150. Additionally the incident laser beam 120 is angled by an angle β with respect to the horizontal plane passing through the lenticular lens 155, depicted as the plane passing through lines 184 and 185. The surface upon which the resulting refracted ray 135 and reflected rays 137 are projected is perpendicular to the lenticular sheet 150. Accordingly, the refracted and reflected rays form close to a perfect circular cone 180 projecting as a circle comprised of the arcs 160 and 162. The angle β causes the circle to be shifted upwards with respect to the lenticular sheet 150, as shown. The rays 135 and 137 together are shaped like a cone 180 which projects a circle, however, the cone is partially projected in front of the lenticular sheet 150 and partially projected behind it due to the fact that is partly formed of reflected rays and partly formed of refracted rays. Accordingly, a laser cone may be formed by using a laser source 110 and a lenticular sheet 150. The cone may be directed up and down by changing the angle β with respect to the horizontal plane as discussed.

Figure 5B:
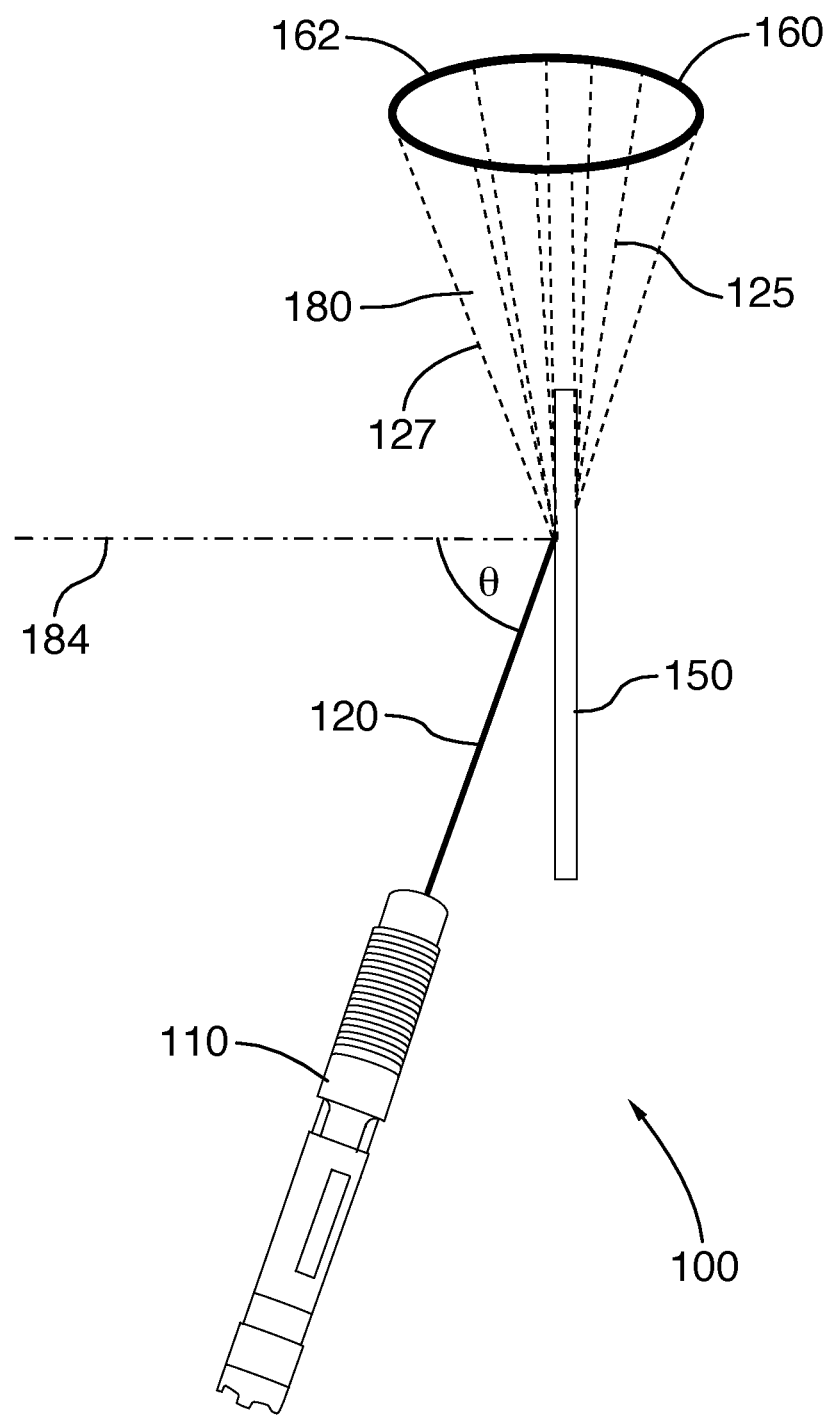
FIG. 5B is a top view of a system for scattering a laser beam aimed at an angle with respect to the perpendicular to an upright lenticular sheet having horizontally-oriented longitudinal lenticular lenses on a lens side thereof and an opposite smooth side, the laser beam being aimed at the lens side of the lenticular sheet.

FIG. 5B is a top perspective view showing a laser beam 120 aimed at a wide angle to the lens side of lenticular sheet 150 wherein the lenticular lenses 155 run parallel to the horizontal plane passing through the laser beam 120. The arc 162 to the left is produced by the beam 120 reflecting off the lenticular lens 155 on the left (lens) side of sheet 150 in the form of reflected rays 127 that project as arc 162. Conversely, the refracted arc 160 to the right is produced by the beam 120 refracting through the lenticular lens 155 and exiting at the smooth side of lenticular sheet 150 as rays 125 that project as the arc 160.

The above results show that laser planes or cones can be produced as the beam is spread out from the lenticular material into the shape such as lines 130 and 135, arcs 140 and 142, and arcs 160 and 162. Unlike some prior art methods where an incident laser beam may be utilized to produce shapes by spinning mirrors, the system 100 presented herein has no moving parts. Various lines, arcs, and cone shapes may be produced solely by changing the angle of the laser beam with respect to the lenticular sheet.

Figure 6:
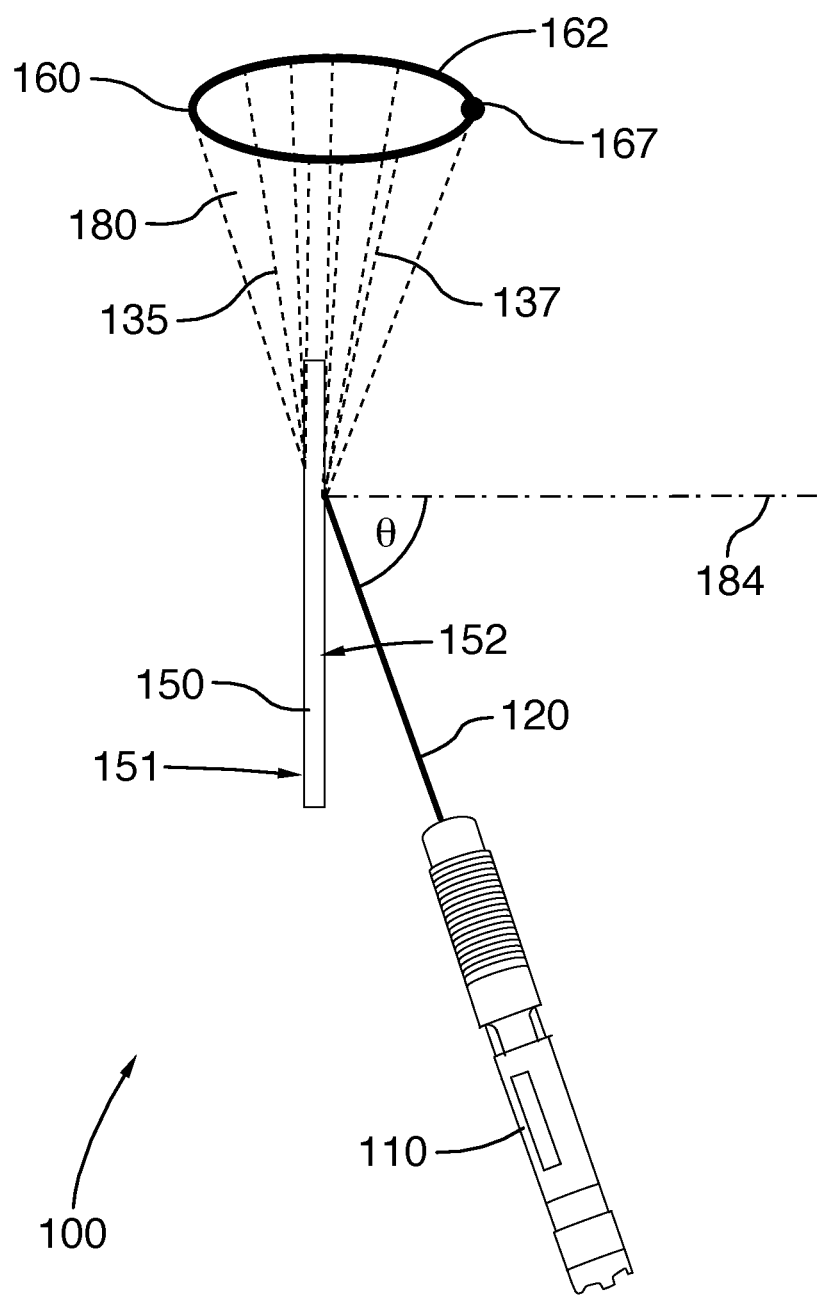
FIG. 6 is a top view of a system for scattering a laser beam aimed at an angle with respect to the perpendicular to an upright lenticular sheet having horizontally-oriented longitudinal lenticular lenses on a lens side thereof and an opposite smooth side, the laser beam being aimed at the smooth side of the lenticular sheet.

It should be noted that while previous figures have shown the laser beam being directed at the lens side of the lenticular sheet, the system has also been operated while projecting the laser beam on the smooth side of the lenticular sheet instead. For example, with reference to FIG. 6, the beam 120 is aimed at the smooth side 152 of a single-sided lenticular sheet 150. In this case the left arc 160 formed is due to the beam refracting through the sheet and exiting at a lenticular lens 155 on the lens side of the sheet as rays 135 which form arc 160. Conversely, the arc 162 to the right of the figure is formed due to the laser beam 120 reflecting off the smooth side of lenticular sheet 150 as rays 137 that form arc 162. Additionally, a bright dot 167 is also formed in the middle of arc 162 due to the beam 120 undergoing direct reflection off the smooth side of lenticular sheet 150. It has been observed that the refracted arc 160 is brighter than the reflected arc 162. The exception is the bright dot 167 on the reflected arc. This has shown that it is preferred to use the lens side 151 of a lenticular sheet to generate laser cones. It has also been observed that the bright dot 167 is movable along the arc 162 as the beam 120 is angled by a small degree with respect to the lenticular sheet 150. Furthermore, the intensity of the bright dot 167 increases as the angle of the beam 120 with respect to the smooth surface of the lenticular sheet 150 is closer to being perpendicular to that surface. The observation made with respect to the bright dot 167 being movable along the arc 162, is an indication that small changes to the angle of the incident laser beam 120 to the lenticular lens 155 causes the rays 137 and 135 to rotate. In essence, changing the angle of incidence resizes the cone and in doing so, all the dots on arcs 160 and 162 rotate circumferentially as they spread in or out as the cone is being resized. For example, decreasing the angle of incidence θ by a small amount causes the rays 137 and 135 to produce a slightly larger cone 180. As the individual dots forming arcs 160 and 162 move towards their newer position they are also moving circumferentially. The opposite happens when the angle of incidence θ is increased; the cone 180 decreases and the individual dots forming arcs 160 and 162 rotate in the opposite direction as they move to their newer positions. This has been confirmed to apply also when the incident laser beam is directed at the lens side 151 of the lenticular lens. The rotation of the dots (and accordingly the beams projecting the dots) was initially observed with respect to the smooth side 152 due to the presence of the bright dot 167, but it applies to all dots forming arcs 160 and 162. Accordingly, tiny adjustments to the angle of incidence θ can be used to move the points circumferentially. This has a significant advantage when it comes to discussing the applications of the generated laser cone.

There are benefits of spreading a laser beam and/or projecting various lines, arcs, and elliptical shapes that have laser rays in the form of laser planes, curves or cones. For example, a security system that uses a thin, focused laser beam is likely to be triggered by any small object blocking the beam. Accordingly, many false positive triggers may occur because of an insect, a small bird, or a rodent passing through the beam. However, if the beam is spread to become a plane (projected as a line), a curved plane (projected as an arc), or a cone (projected as a circle), then it could take a larger object such as a human, a drone, or a vehicle to block a larger portion of the beam and trigger an alert condition. Since conditions may change or vary for various areas, the sizes of the planes and cones can also vary. Advantageously, changing the dimensions of the laser planes or cones are a simple matter of changing the angle and/or position of projection of the incident laser beams on the lenticular lens. Additionally or alternatively, different lenticular sheets may be used each with different viewing angles or lens density (LPI). For example, a lenticular sheet with a different viewing angle may produce a projected laser cone or plane with different dimensions for the same laser beam or beams projected with the same angle thereon.

Figure 7A:
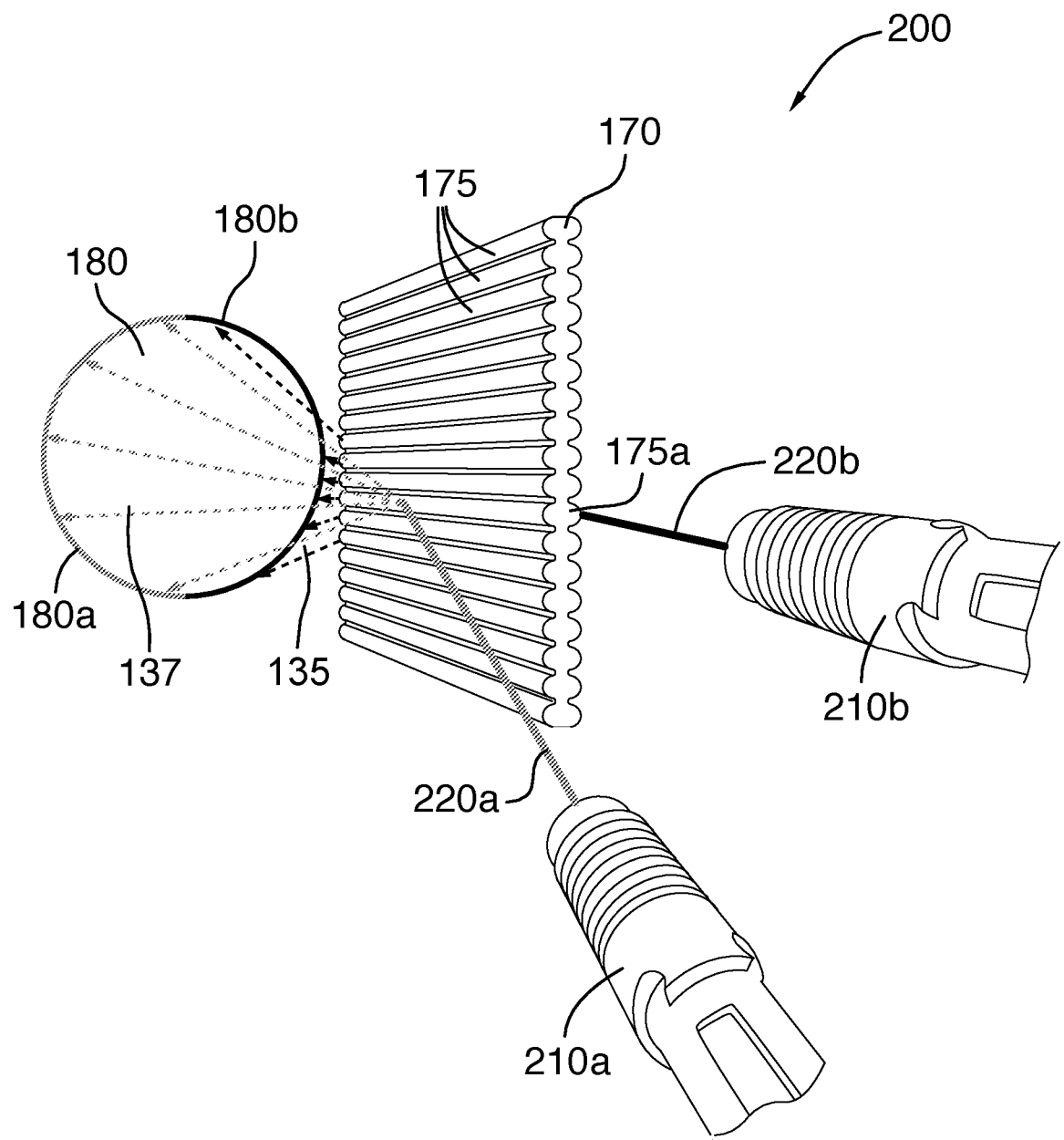
FIG. 7A is a side perspective view of a system for scattering two laser beams of different color each aimed at an opposing side of a double-sided lenticular sheet having horizontally oriented longitudinal lenticular lenses on each of its two opposite sides, wherein the two beams are aimed at both sides of a single location on a longitudinal lenticular lens on each of the opposite side, wherein each of the two laser beams forms an angle with respect to the perpendicular to a respective side of the lenticular sheet at the single location, and wherein both beams lie in the same horizontal plane passing through the longitudinal lenticular lens at which they are aimed.
Figure 7B:
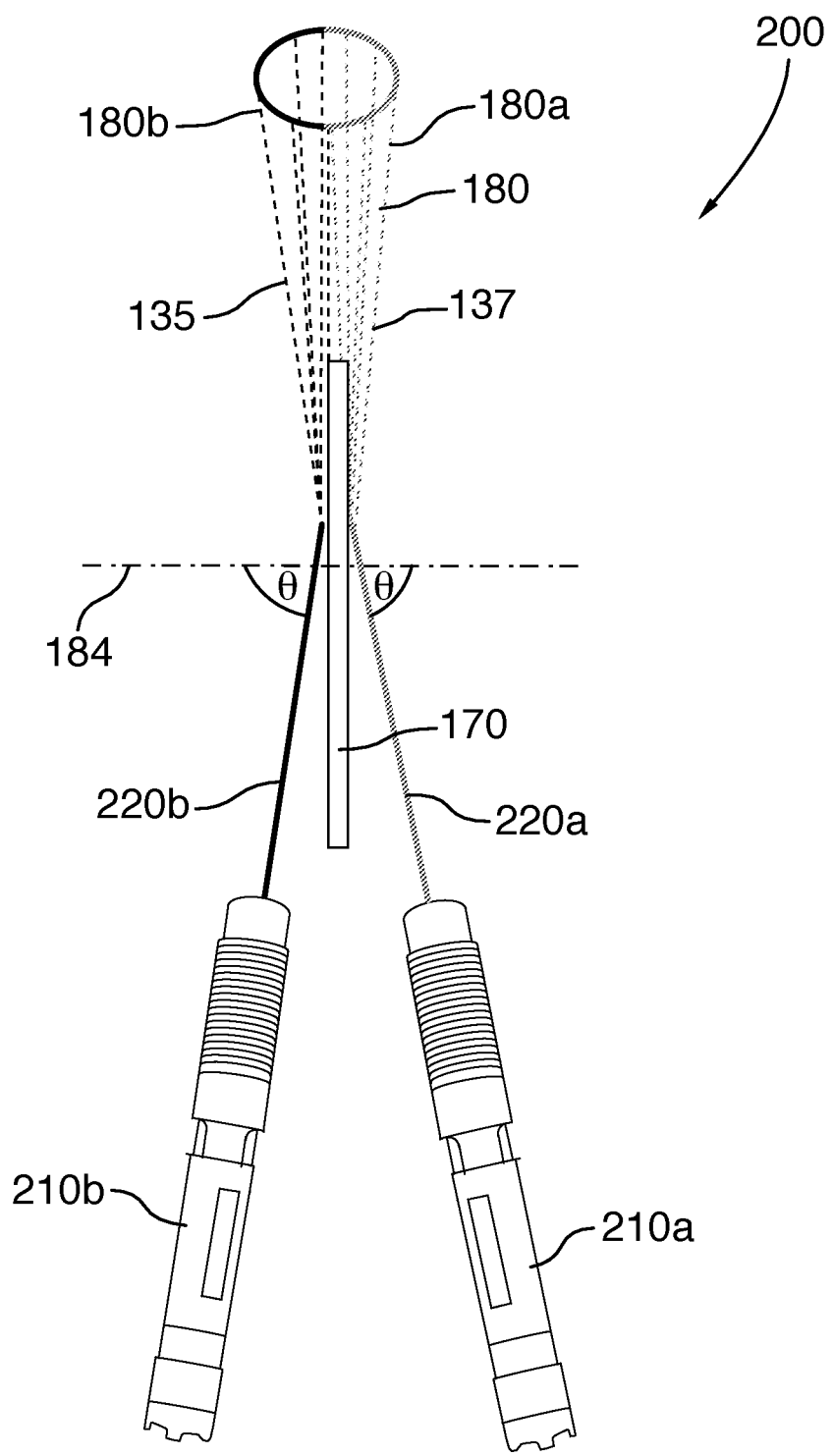
FIG. 7B is a top view of the system of FIG. 7A but with the two colored laser sources swapped in position and each aimed at a larger angle with respect to the perpendicular to a respective surface of the double-sided lenticular sheet, such that all incident rays are reflected.

With reference to FIGS. 7A and 7B, there is provided a system 200 for projecting a laser cone 180. The system 200 is comprised of two laser sources 210a and 210b, and a double-sided lenticular sheet 170. The double-sided lenticular sheet 170 has a plurality of longitudinal lenticular lenses 175 on both sides thereof. The laser source 210a projects an incident laser beam 220a having a first color, and the laser source 210b projects an incident laser beam 220b having a second color different from the first color. For example, the laser beam 220a may be green while the laser beam 220b may be red. The incident laser beams 220a and 220b are both aimed at opposite sides of the double-sided lenticular sheet 170, and with different angles of incidence. The incident laser beam 220a is reflected off one side of lenticular lens 175a of lenticular sheet in the form of the rays 137. When the rays 137 fall on or meet a flat surface, they project an arc 180a to the front of the lenticular sheet 170. The incident laser beam 220b, on the other hand, is projected at the opposite side of lenticular lens 175a at a smaller angle of incidence relative to the perpendicular direction to the lenticular sheet 170. As such, beam 220b projects on the rear side of the lenticular sheet 170 and is reflected off the lenticular lens 175a. The rays that reflect off the lens 175a and are reflected as rays 135, form a curved surface such as a partial cone and project an arc 180b to the front of the lenticular sheet. Advantageously, the two arcs 180a and 180b are complementary as long as the two beams are projected at opposite sides of the same location on a particular lenticular lens of the double-sided lenticular sheet 170. The resulting ray configuration comprised of rays 135 and rays 137 170 is in the shape of a cone 180. The angle of incidence of incident laser beam 220a is chosen so that most of the rays are reflected as rays 137, whereas the angle of incident laser beam 220b is chosen so that most of the rays are reflected in a higher concentration as rays 135. If the angle of incidence of laser source 210a is great enough, laser beam 220a will go through the lenticular sheet 170 and refract in an arc on the other side near or on top of arc 180b.

In FIG. 7B the angles of incidence of incident laser beams 220a and 220b are both large such that both beams are reflected off of the respective surfaces of the double-sided lenticular lens 170. The resulting laser cone 180 is thus quite narrow, but is comprised entirely of reflected rays.

Figure 8A:
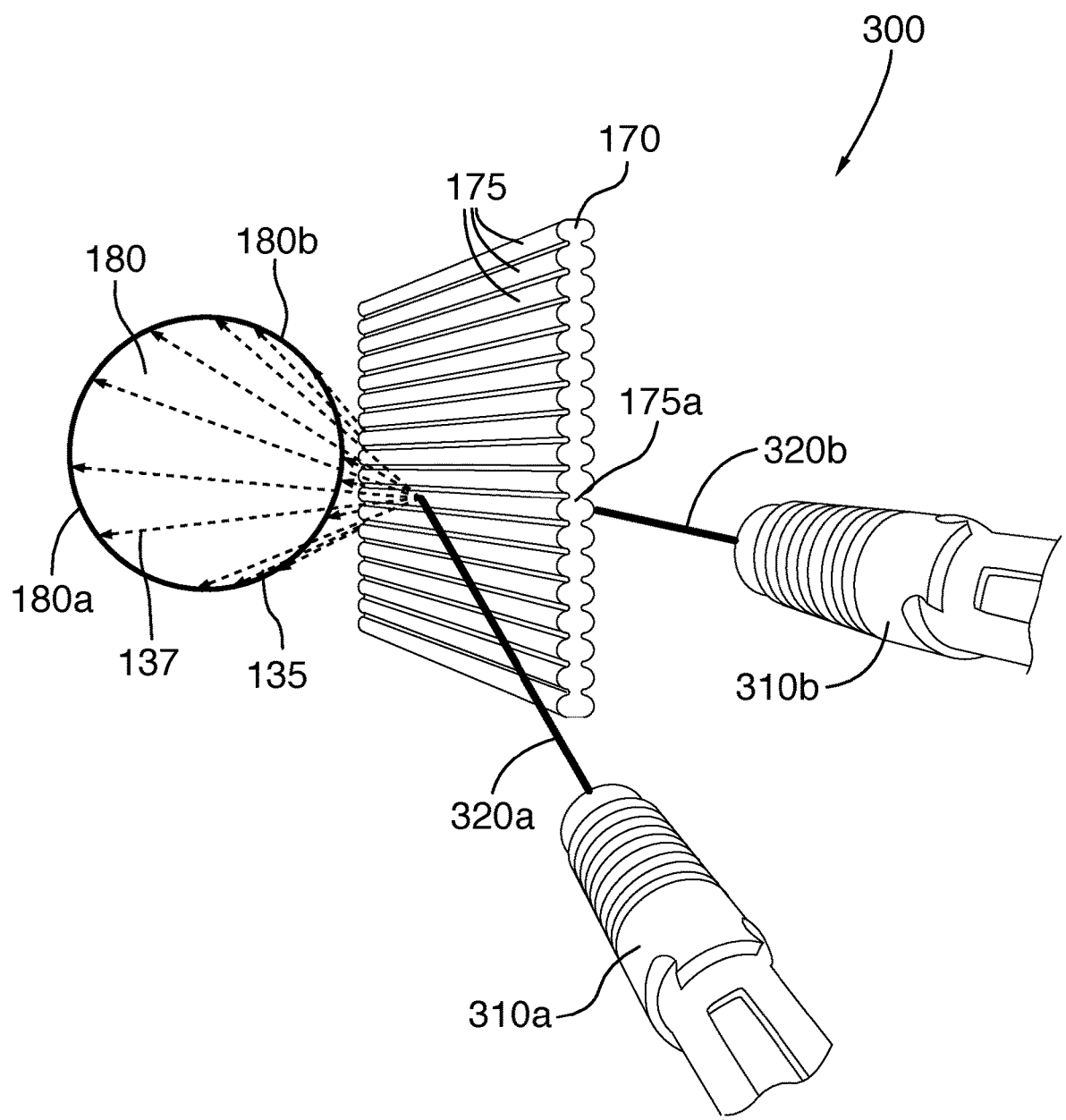
FIG. 8A is a side perspective view of the system of FIG. 7B, wherein the two laser beams are of the same color.

FIG. 8A shows a system 300 in which the two laser sources 310a and 310b project laser beams 320 and 320b of the same color. Accordingly, the resulting cone 180 appears to come from the same laser source although it is a composite of the reflected rays 137 from the incident laser beam 320a and the refracted rays 137 from the incident laser beam 320b. The result is a laser cone 180 comprised of the two half laser cones 180a and 180b that are of a single color. The laser cone 180 has a number of useful applications, as indicated below.

Figure 8B:
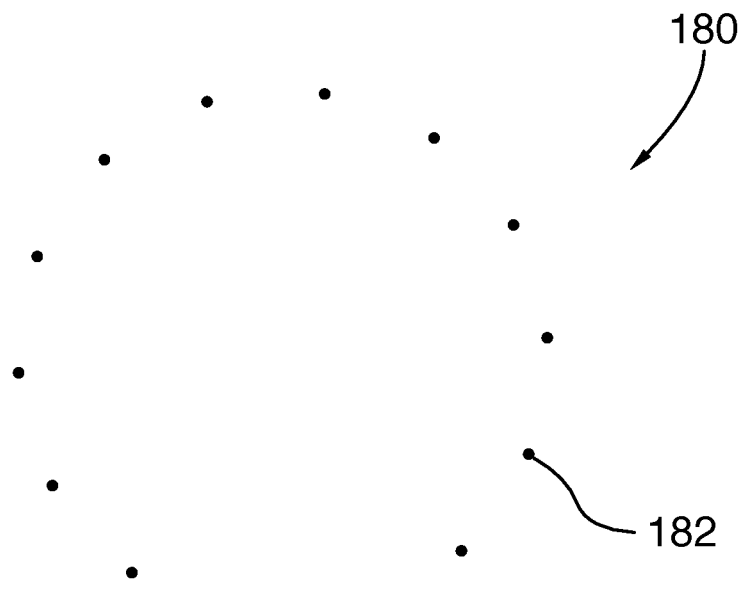
FIG. 8B is a projection view of the circle formed by the laser beams of FIG. 8A, when projected on a flat surface at a far distance.

FIG. 8B shows that the laser cone 180, produced by the system 300 of FIG. 8A for example, when projected at a surface which is far away from the laser source is actually comprised of a plurality of rays projecting as circumferential dots 182. Typical arcs and cones are composed of many hundreds of dots. However, as has been discussed with respect to FIG. 6, minor adjustments of angle of incidence of the incident laser beams cause the dots 182 to rotate circumferentially (either clockwise or counter clockwise). Accordingly, this can be used to detect objects that would normally pass undetected between the rays projecting those dots, as discussed below.

LIDAR (Light Detection and Ranging) currently utilizes a pulsed laser or lasers to bounce a signal off the surrounding environment, and a sensor for detecting the reflected signals. Accordingly, by measuring the time that signal takes to reflect back to the sensor, a computer may determine the distance to objects and/or create a three-dimensional map of the surrounding area and surface characteristics. Topographic LIDAR uses near-infrared lasers to map the land, and Bathymetric LIDAR uses green lasers to penetrate the water and map the sea floor and riverbeds. The use of LIDAR through water is, however, often limited to only tens of feet. LIDAR is a key component of self-driving cars and the more accurate the LIDAR, the safer the system can be. LIDAR is also being tested in aircraft to determine regions of turbulence in front of the aircraft to allow the aircraft to avoid or prepare for those areas. LIDAR could also be used by a civilian body or the military to search for targets, shallow underwater, on the ground, or in the air (cloudless) or in space. Low observable aircraft, drones, birds, and bats, which are difficult to detect by radar, may be detected by this type of system.

Utilizing the above-described systems to create a flat plane, curved plane and/or a cone, instead of a laser point, much more detail could be determined by the sensor to increase the effectiveness over a shorter period of time and a greater angle may be achieved than current LIDAR systems. In one embodiment, a laser cone could be made variable from narrow to wide to scan a large portion of the sky while sensors would pick up any reflection off of other aircraft, aircraft contrails, aircraft turbulence, natural turbulence, drones, missiles, projectiles, rockets, bullets, balloons, birds, bats or swarms of insects.

Figure 8C:
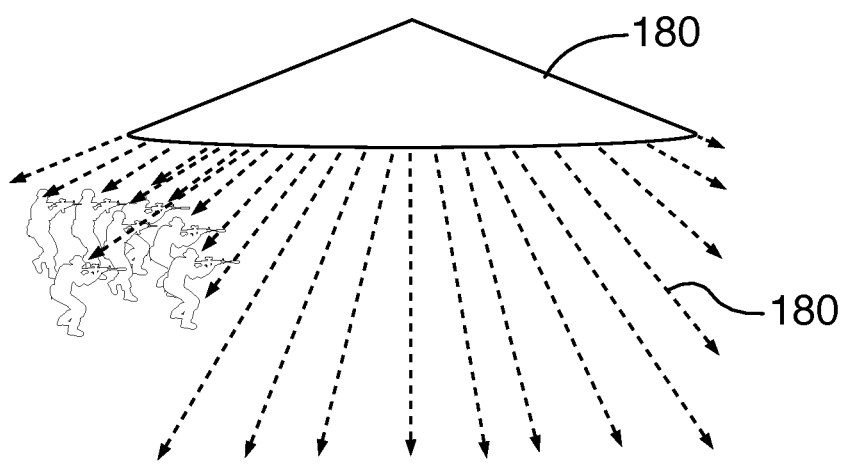
FIG. 8C is a schematic diagram depicting an airborne LIDAR system utilizing a laser cone to detect enemy ground troops.
Figure 8D:
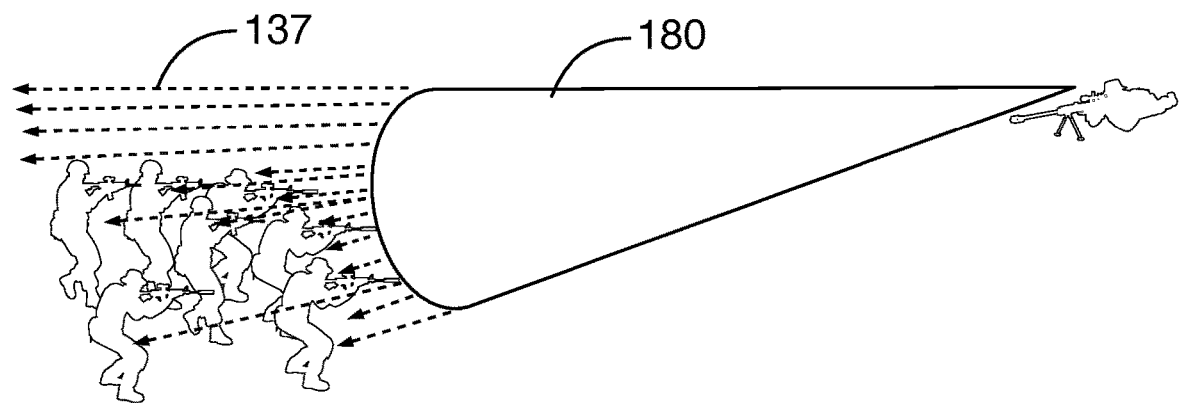
FIG. 8D is a schematic diagram depicting a LIDAR system utilizing a laser cone used by a sniper to detect enemy ground troops.
Figure 8E:
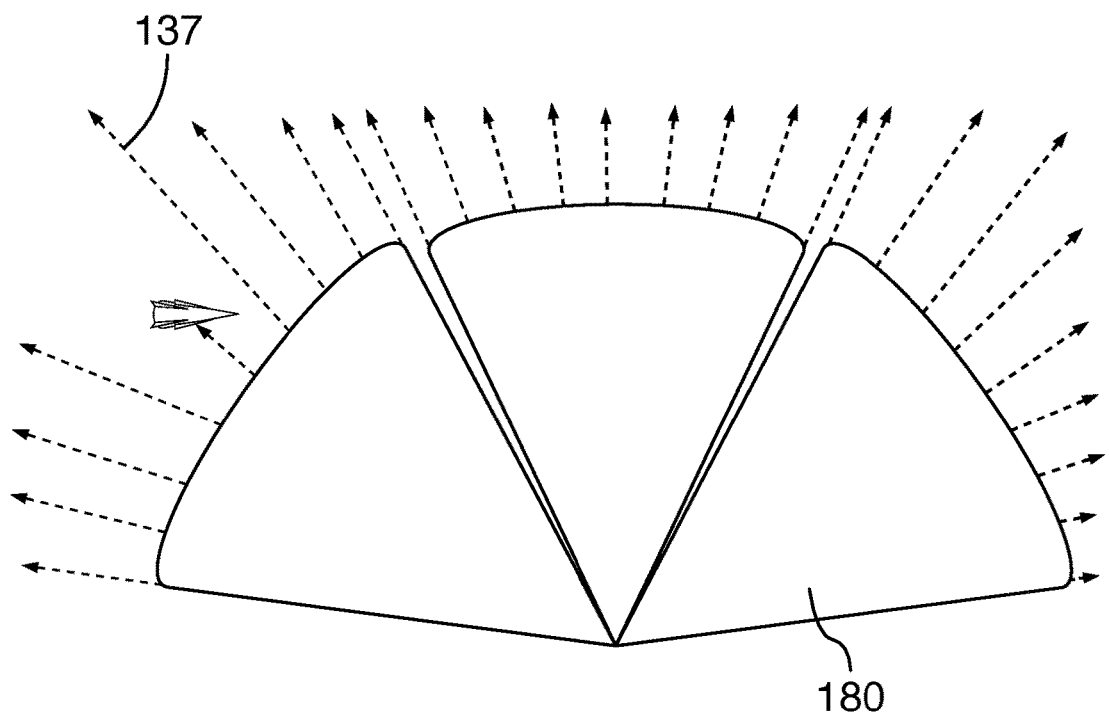
FIG. 8E is a schematic diagram depicting a ground-based LIDAR system utilizing multiple laser cones to detect a missile.
Figure 8F:
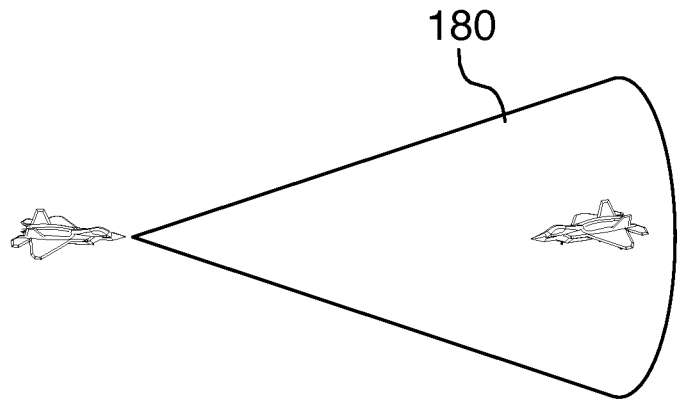
FIG. 8F is a schematic diagram depicting an enemy aircraft being detected by an airborne LIDAR system utilizing a laser cone mounted in another fight aircraft.
Figure 8G:
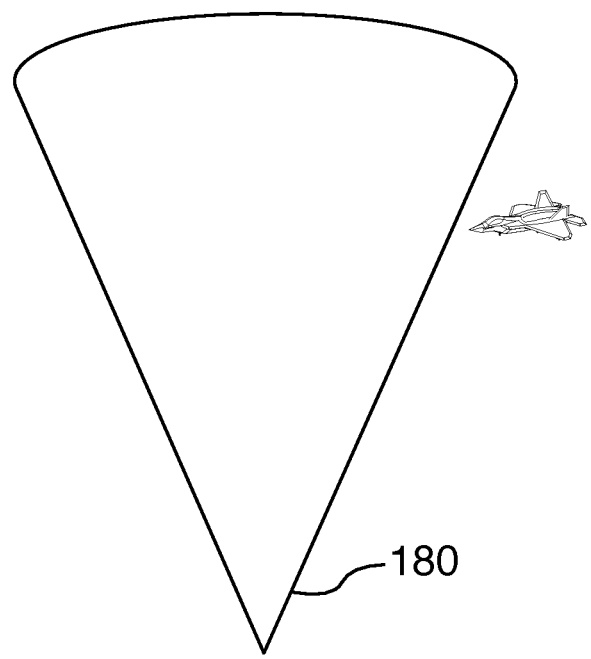
FIG. 8G is a schematic diagram depicting an enemy aircraft about to be detected by a ground-based LIAR system utilizing a laser cone.

FIG. 8C shows a laser cone 180 comprised of a plurality of rays 137 produced by an airborne LIDAR system and being used to detect ground troops. FIG. 8D shows a laser cone, used by a LIDAR system used by a sniper to detect one or more enemy troops. FIG. 8E shows a land-based LIDAR system utilizing 3 laser cones 180 each comprised of a plurality of rays 137. The land-based LIAR is used to detect a missile. FIG. 8F depicts a laser cone produced by an airborne LIDAR system used to detect an enemy aircraft. FIG. 8G depicts a ground-based LIDAR system projecting a cone 180 for detecting an aircraft. The cones shown in FIGS. 8C-8G are comprised of a plurality of rays as discussed above, which project as a circle as shown in FIG. 8B. Typical arcs and cones are composed of many hundreds of dots. In order to ensure that the object to be detected does not pass between two circumferentially adjacent rays, the rays are moved circumferentially such that each ray sweeps the circumferential arc between its present location and the location of an adjacent ray. In one embodiment, this is accomplished by tiny adjustments of laser source to change the angle of incidence of the incident laser beam or beams with respect to the lenticular lens. In another embodiment, the lenticular sheet is slightly moved or rotated to change the angle of incidence of the incident laser beam or beams so that the refracted rays are slightly rotated circumferentially as discussed.

Figure 9A:
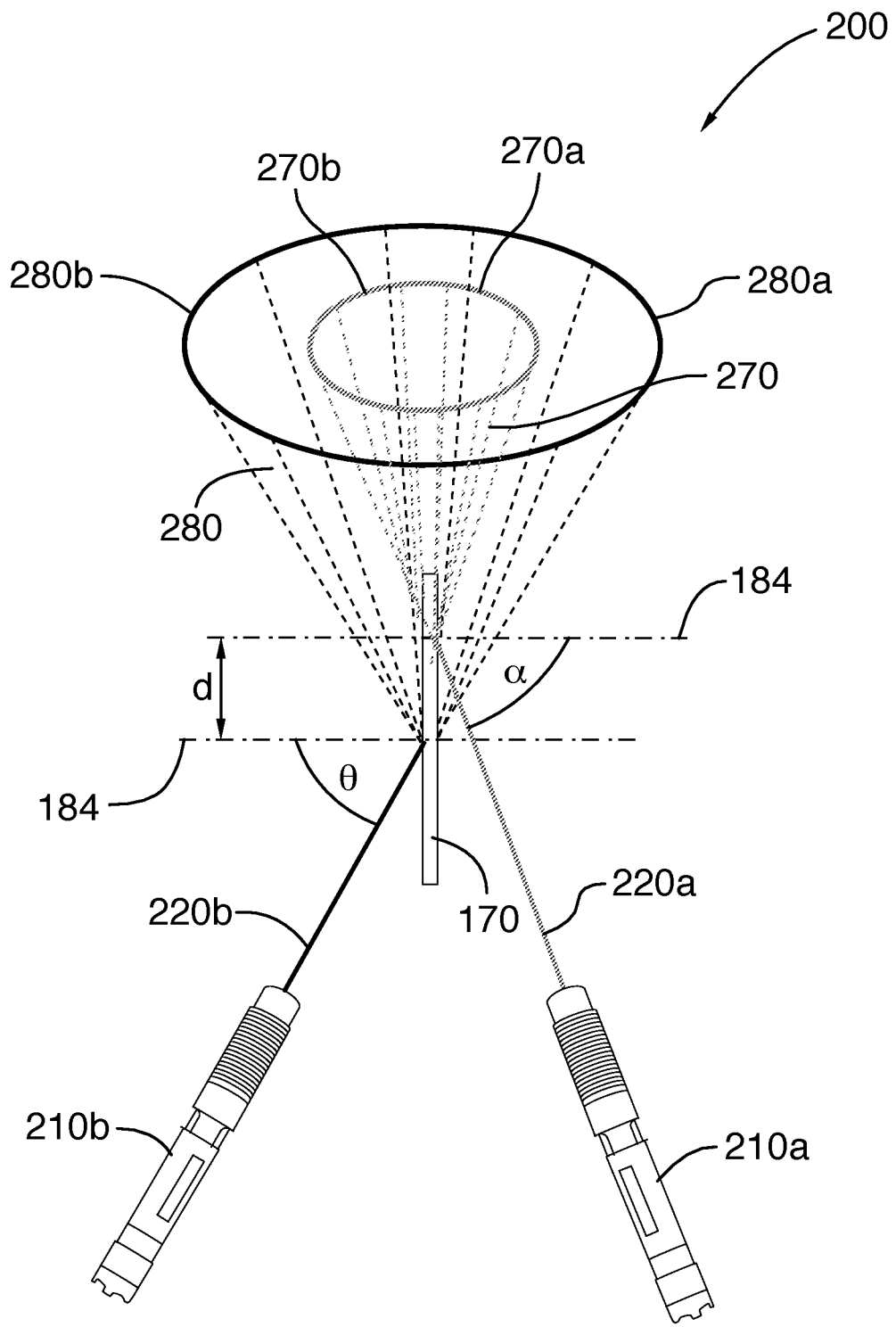
FIG. 9A is a top view of a system for scattering two laser beams of different color each aimed at an opposing side of a double-sided lenticular sheet having horizontally oriented longitudinal lenticular lenses on each of its two opposite sides, wherein the two beams are aimed at different locations on a longitudinal lenticular lens on each of the opposite sides, wherein each of the two laser beams forms a different angle with respect to the perpendicular to a respective side of the lenticular sheet, and wherein both beams lie in the same horizontal plane passing through the longitudinal lenticular lens at which they are aimed.

FIG. 9A shows a system 200 comprised of a double-sided lenticular sheet 170, and two laser sources 210a and 210b. The laser source 210a projects the incident laser beam 220a, and laser source 210b projects the incident laser beam 220b. The laser beam 220a produces a reflected arc 270a and a refracted arc 270b as described earlier. Similarly, the laser beam 220b produces a reflected arc 280a and a refracted arc 280b. The laser beam 220b is angled to the perpendicular direction 184 on the lenticular sheet 170 by an angle that is greater than that of laser beam 220a. Accordingly, the arcs 280a and 280b produced by the incident laser beam 220b are bigger in dimension that the arcs 270a and 270b produced by the incident laser beam 220a. Consequently the laser cone 280 formed by the reflected and refracted rays from beam 220b is larger than the laser cone 270 formed by the reflected and refracted rays from beam 220a. Since beams 220a and 220b are projected at either sides of the same lenticular lens, then the two cones are coaxial. In the depicted embodiment, the laser beams are directed at different lateral spots of the lenticular lens, which are spaced apart horizontally by a distance (d). The resulting cones are therefore nested such that an object traveling inside cone 280 may be detected by cone 270. The laser source 210a may be moved in a horizontal plane to vary the distance (d). Accordingly, the size and position of cone 270 with respect to cone 280 varies. The resulting effect is that the entire volume between the cone 270 and 280 may be swept and covered by laser rays that may be used to detect any object between the cones.

Figure 9B:
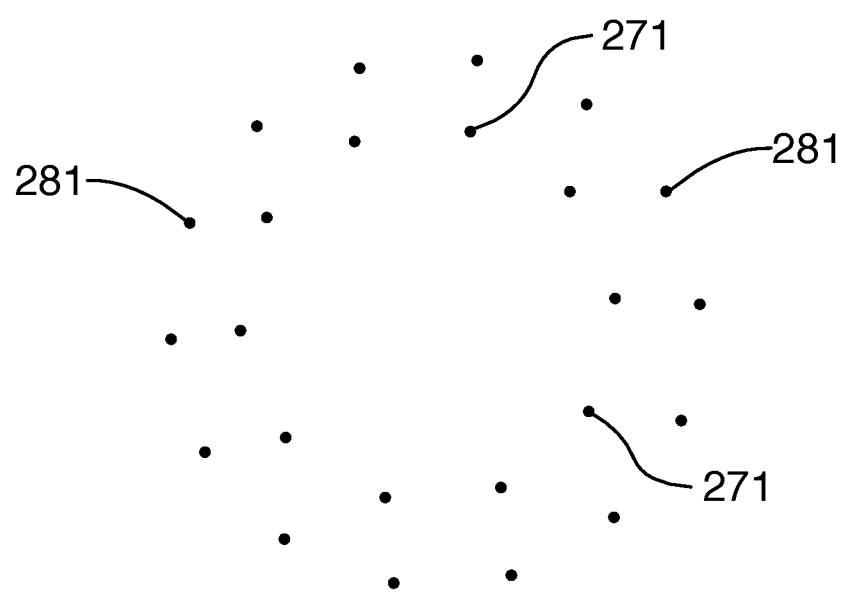
FIG. 9B is a projection view of the circles formed by the laser beams of FIG. 9A, when projected on a flat surface at a far distance.

In one embodiment, the laser source 210a, for example may be moved back and forth to sweep the volume between cone 270 and 280, and additionally, the laser source 210 may have its angle of incidence slightly altered to rotate the rays forming cone 270. For example with reference to FIG. 9B, the dots 271 represent the rays of cone 270 when projected on a flat surface. Similarly, the dots 281 represent the rays of cone 280 when projected on a flat surface. If the laser source 210a is moved such that the distance (d) in FIG. 9A is smaller than cone 270 expands so the dots 271 move closer to dots 281. Furthermore, if laser source 210a is angled slightly causing each dot 271 to rotate to the location previously occupied by an adjacent dot, then the volume between cones 270 and 280 is completely covered for object detection in both the radial and the circumferential directions. In another embodiment, the laser source 210b is moved such that the cone 280 is made smaller, and laser source 210a is moved such that cone 270 is made smaller until it is nearly diminished. This is done by angling laser source 210a until it is at a large obtuse angle (close to 180 degrees) from the perpendicular direction to the lenticular sheet 170. Accordingly, the entire volume encompassed by laser cone 280 is swept for object detection. For example, the cone 270 may be half the size of cone 280 and it may take the same time for cone 280 to be reduced in size to match the initial size of cone 270 as it takes for cone 270 to be nearly diminished in size. During that time, the entire volume of cone 280 is swept radially. Alternatively, a few more laser sources may be added and aimed such that their respective beams are also displaced from one another by a distance such as (d). Accordingly, a number of concentric cones may be utilized to cover the volume encompassed by the outermost laser cone 280. In such embodiment, it may not be necessary to vary the sizes of the laser cones, and it may be sufficient to simply rotate them so that each cone area is swept circumferentially.

A stationary laser cone could also be rotated like a radar or LIDAR does rather than variable changing of the cone angle. LIDAR often uses mirrors to rapidly spin a laser source and the same could occur with these lines, arcs or cones. A combination of rotation of the cone and variable angling of the cone from narrow to wide may also be used and more than one laser may be used for multiple cones of similar or different angles may be used with the same lens or other lenses to increase the area being scanned. The laser cone may be stationary with more than one laser being used for multiple cones of varying angles. In space, this system could be used to detect other space-based objects, whether natural (meteorites, asteroids, comets . . . ) or artificial (satellites, spacecraft, astronauts, space junk . . . ).

Figure 10A:
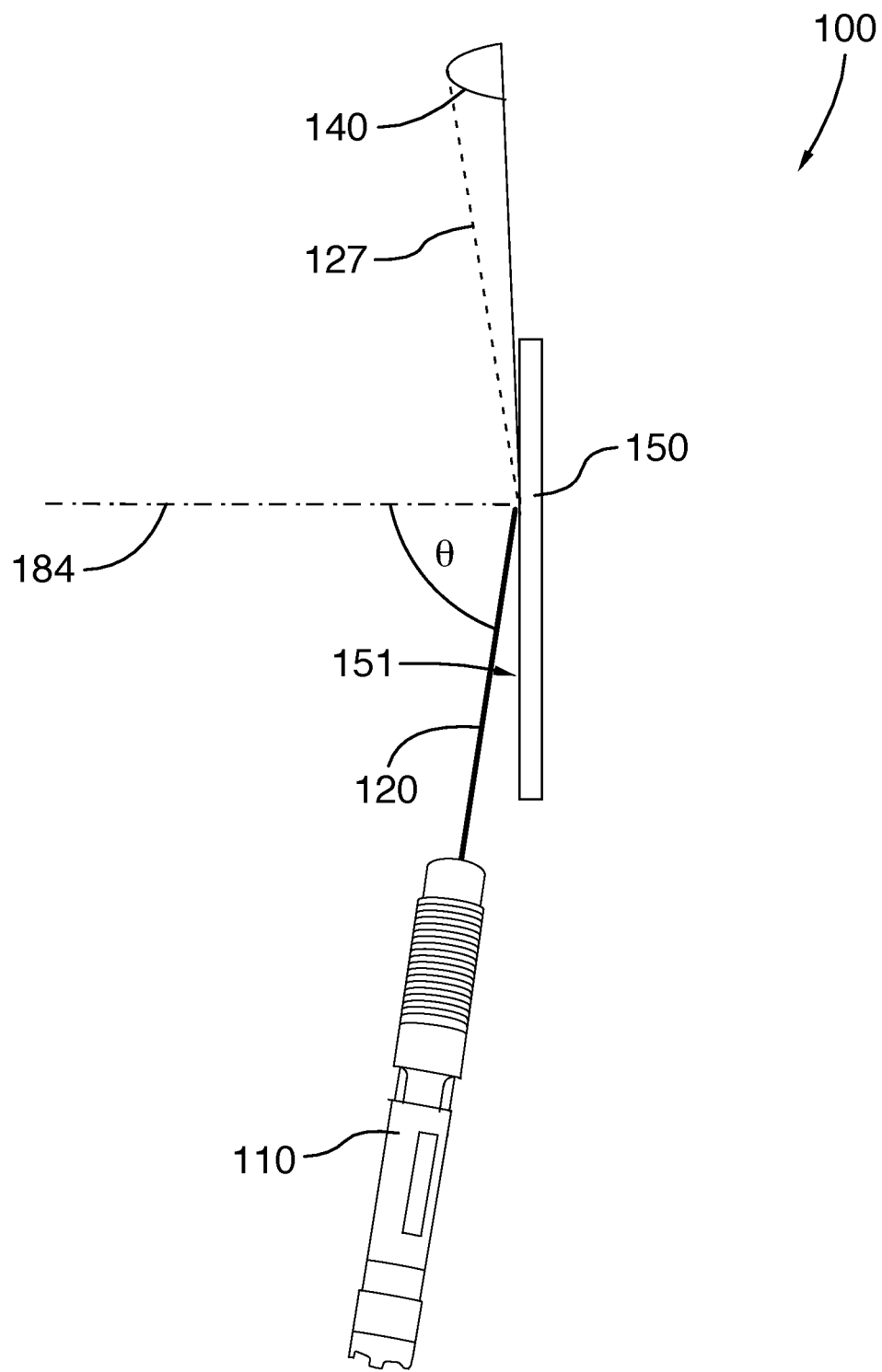
FIG. 10A is a top view of a system for scattering a laser beam aimed at an angle with respect to the perpendicular to an upright lenticular sheet having horizontally-oriented longitudinal lenticular lenses on a lens side thereof and an opposite smooth side, the laser beam being aimed at the lens side of the lenticular sheet at such an angle that all rays of the laser beam are reflected off a lenticular lens on the lens side.

With reference to FIG. 10A, a system 100 similar to that shown in FIGS. 1-6 can be used to produce a partial laser cone that projects as an arc 140. The laser source 110 projects an incident laser beam 120 angled by a large angle θ relative to the line 184 perpendicular to the surface of the lens side 151 of a single-sided lenticular sheet such as sheet 150. This produces a reflection only of the rays of the incident laser beam 120, in the form of reflected rays 127 that project as arc 140. As discussed above, further increasing the angle θ leads to the arc eventually being diminished entirely.

It has been observed that, in order to produce a circular cone produced by reflection only of laser beams off a double-sided lenticular sheet 170, that the incident angle of the incident laser beam 120 needs to be large with respect to the perpendicular direction on the lenticular sheet. If the angle is not large enough, then part of the rays are refracted and another part is reflected. The resulting pattern may be two cones instead of one. In the system shown in FIG. 10B, the double-sided lenticular sheet 170 has been replaced by two back-to-back single sided lenticular lens sheets 150 and a sheet of bright opaque material 160 or a mirror inserted therebetween. In this configuration, the bright opaque material or mirror prevents refraction of laser beams through the lenticular lens sheets and instead reflects the beams. Accordingly, the resulting pattern may be a larger cone as the angle may be larger than, for example, the angle used in FIG. 10A.

Figure 10B:
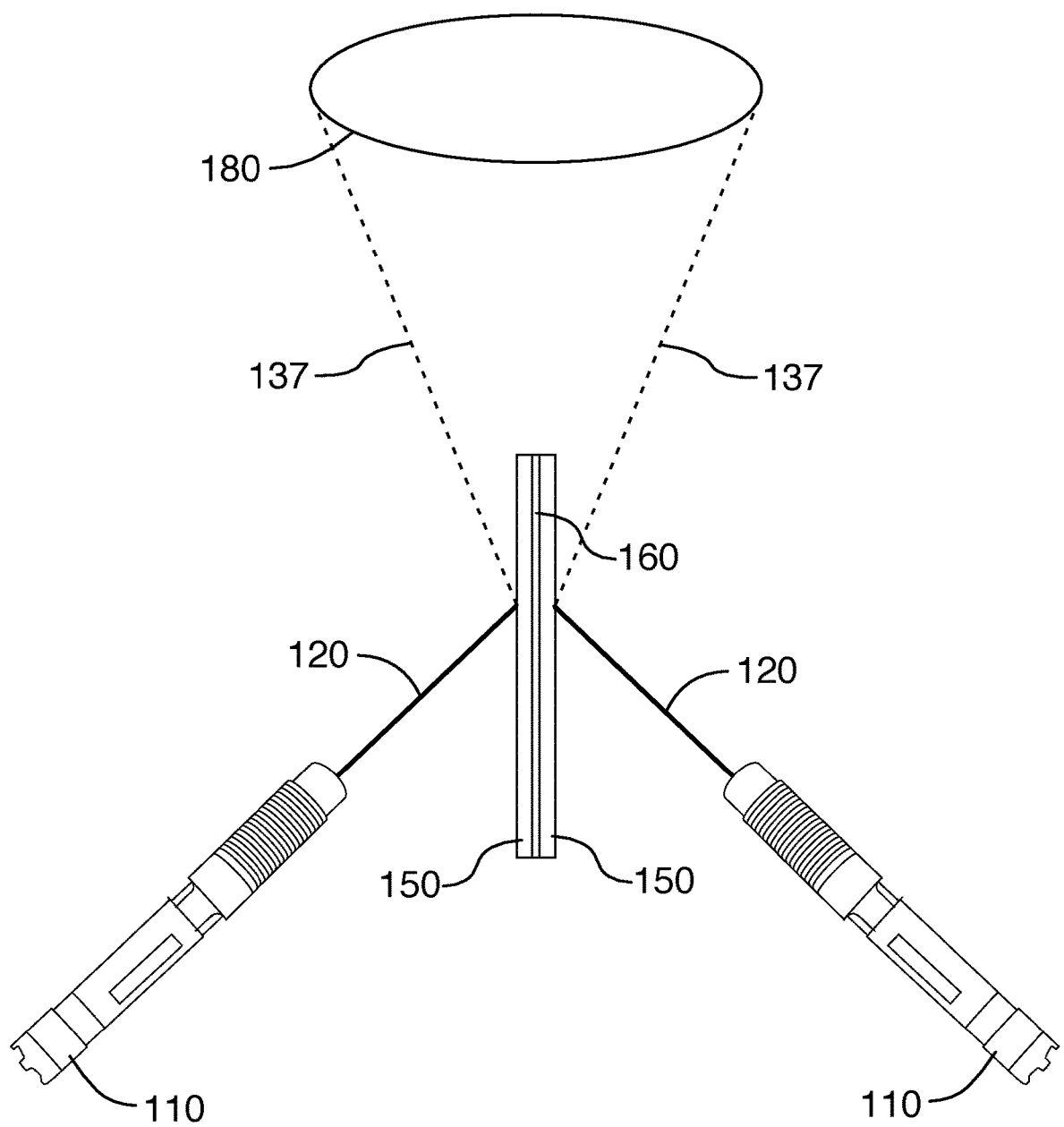
FIG. 10B is a top view of a system for scattering two laser beams each aimed at a corresponding lens side of two back-to-back single-sided lenticular sheets having horizontally oriented longitudinal lenticular lenses, wherein the two beams are aimed at both sides of a single location on a corresponding longitudinal lenticular lens on each of the opposite side, wherein each of the two laser beams forms the same angle with respect to the perpendicular to a respective side of the lenticular sheet at the single location, and wherein the two lenticular sheets are separated by a bright opaque sheet.
Figure 10C:
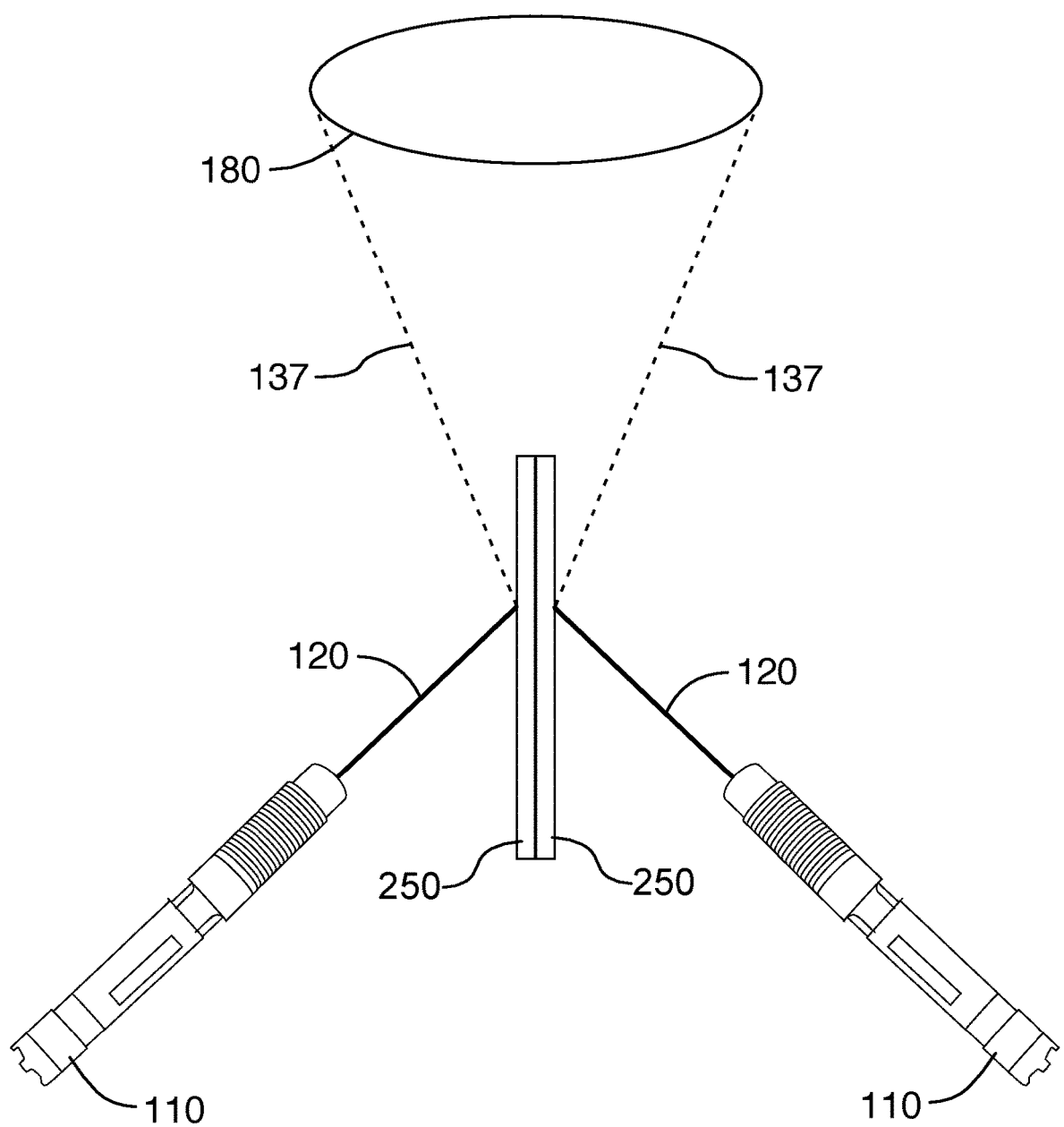

FIG. 10C shows a system similar to that of FIG. 10B, but uses two back-to-back lenticular sheets 250 each having a highly reflective lens side. For example, the lenticular lenses of the lenticular sheets 250 may be made from a highly reflective material or have a highly reflective coating. The high reflectiveness of the lens side prevents refraction of laser beams through the lenticular lens sheets and instead reflects the beams. Accordingly, the resulting pattern may be a larger cone as the angle may be larger than, for example, the angle used in FIG. 10A.

The laser sources may be moved slightly to the left or to the right with respect to the lenticular sheet to cause the dots to move clockwise or counterclockwise. Given the proximity of each projected dot to the ones adjacent thereto, very little movement by the laser source may be required to have each dot cross the gap to the next adjacent dot position. Another possible embodiment is to move the lenticular sheet itself. Very little movement by the sheet would be needed to move the dots to cross the gap. In one embodiment, the lenticular sheet may be in the form of a cylinder, which can be slightly movable. A simple gear and spring mechanism may be utilized to create a slow and steady movement. For example, a winding mechanism similar to old wind-up watches may be used. The mechanism may include reduction gears to provide a slow but steady timing motion to rotate one of the laser sources and the lenticular material used to divert the laser beams of the laser sources. If the mechanism is applied to the first laser source to move it slightly to the left or to the right, then a second laser source may be required to offset the stopping of the dots as the first laser source reaches the far left or far right point while the second laser is in the middle of a sweep. Utilizing a spinning mirror may also spin the line, arc or cone.

Experiments have shown the regardless of the shape, a stealth type aerial vehicle cannot effectively scatter electromagnetic energy lying at the smaller wave lengths of light emitted by LIDAR. A fast moving jet aircraft or a new hypersonic missile may be able to fly through gaps between the diverted laser rays discussed, but it is highly unlikely to be able to do so if the rays forming the cones discussed are also moving clockwise or counter clockwise accomplished by either moving the lenticular lenses or the laser sources. Additionally, turbulence produced by such vehicles may also be detected by LIDAR.

Figure 11:
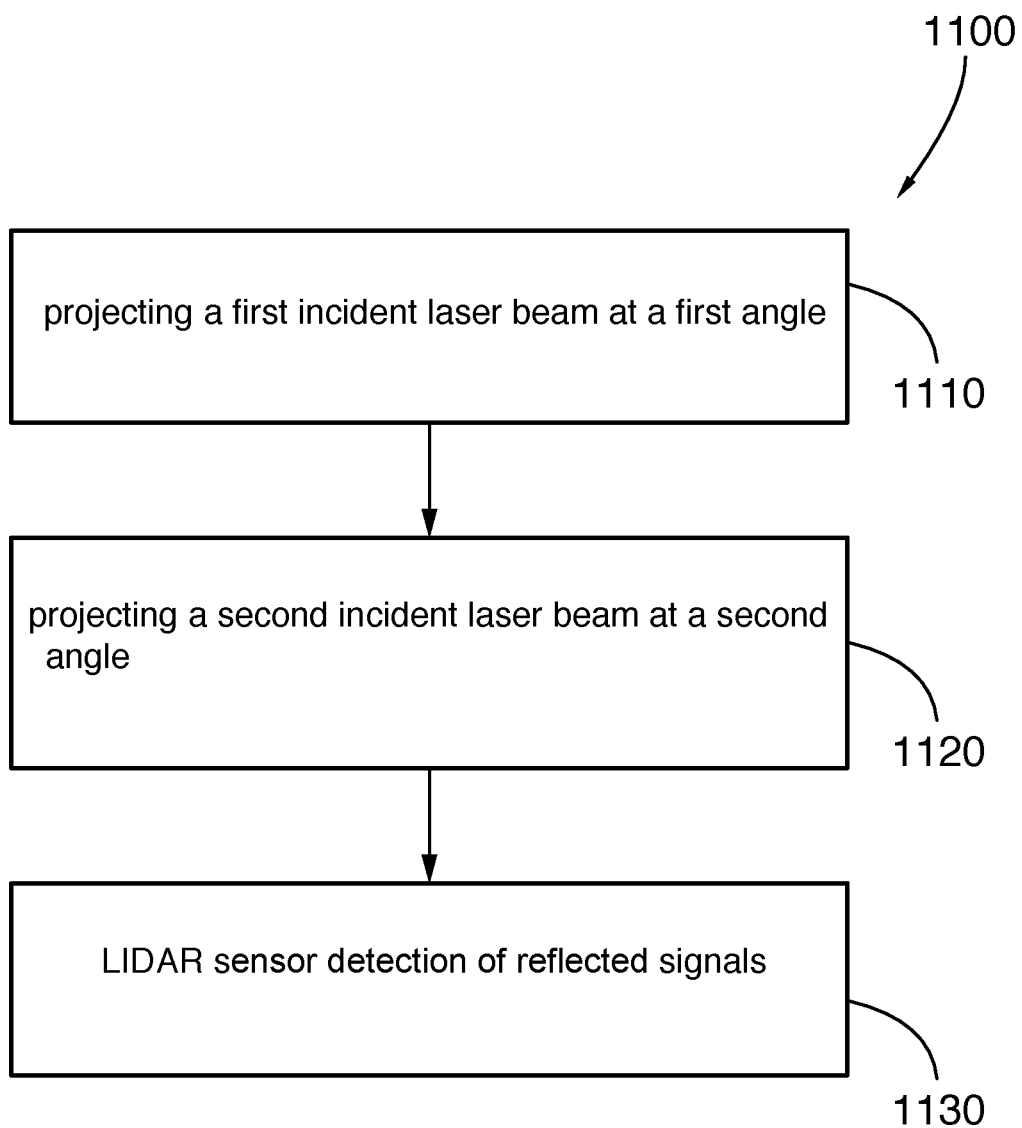
FIG. 11 is a flow chart for a method of detecting an object by a LIDAR system utilizing a double-sided lenticular sheet.

FIG. 11 depicts a method 1100 for detecting an object using a LIDAR system. At step 1110, a first incident laser beams is projected onto a first lens side of a double-sided lenticular sheet for producing a first half cone of reflected rays. At step 1120, a second incident laser beam is projected at a second angle onto a second lens side of the double-sided lenticular sheet for producing a second half conde of reflected rays that, together with the first half-cone of reflected rays forms a full cone of reflected rays. At step 1130, a sensor of the LIDAR system, detects signals reflected off an object when that object crosses any one of the reflected rays of the full cone.

Figure 12:
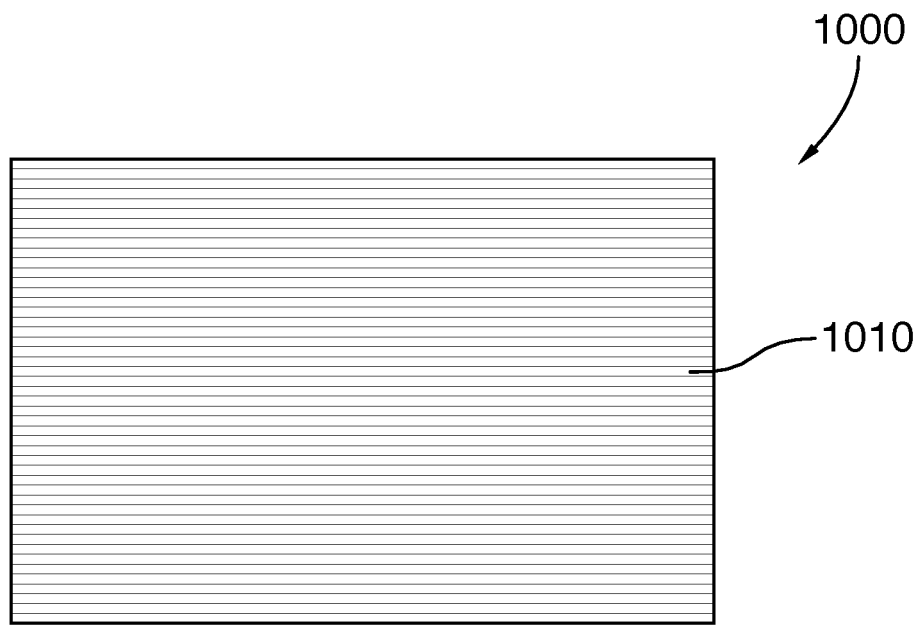
FIG. 12 is a top view of a linear diffraction grating.
Figure 13:
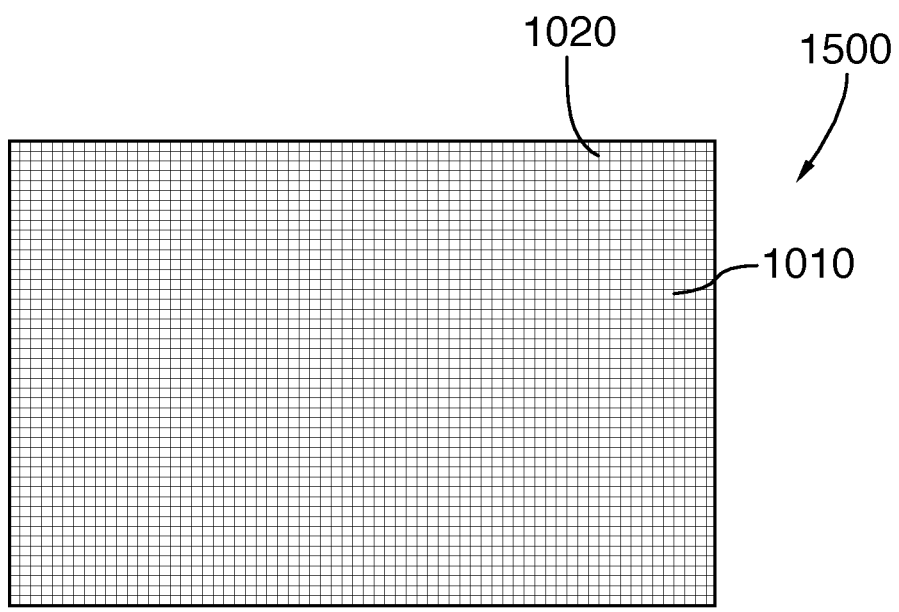
FIG. 13 is a top view of a double-axis diffraction grating.

FIG. 12 is a top plan view of a diffraction side of a linear (single axis) diffraction grating 1000 having a plurality of lines 1010. The opposite side of the diffraction grating 1000 is a smooth flat surface. FIG. 13 is a top plan view of a diffraction side of a double-axis diffraction grating 1500 having a plurality of horizontal lines 1010 and a plurality of vertical lines 1020. The opposite side of the double-axis diffraction grating 1500 is a smooth flat surface.

Figure 14:
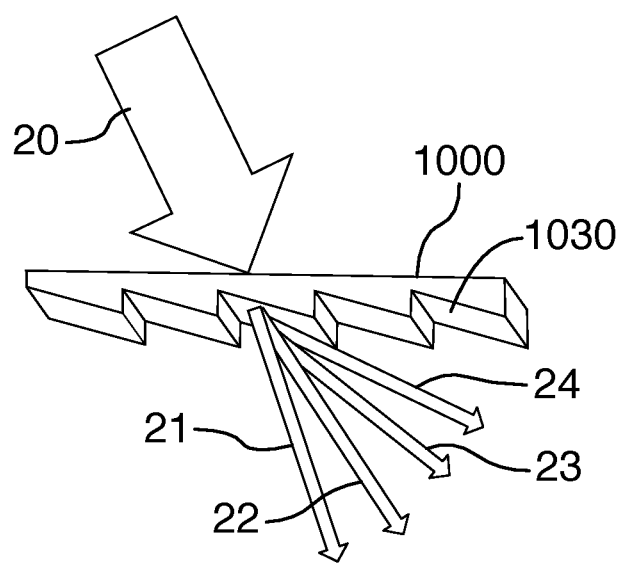
FIG. 14 is a perspective schematic diagram showing the spectrum produced by directing light from a white light source through a linear diffraction grating.

FIG. 14 shows an incident light beam 20 is aimed towards the smooth surface of the diffraction grating 1000 at an angle to the normal. The different colored light of rays comprising the beam 20 are refracted in the same manner as they would have been refracted off of a prism and decomposed into rays 21, 22, 23, and 24 of different colors.

Figure 15:
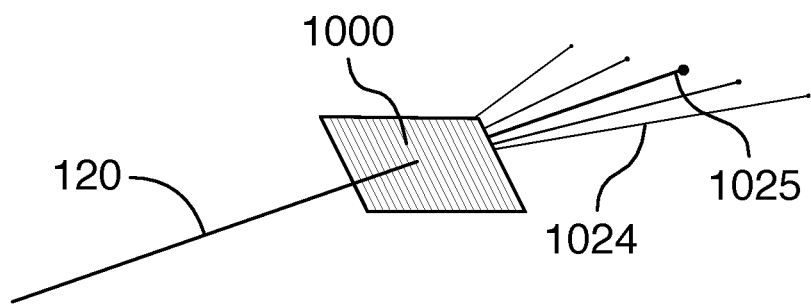
FIG. 15 is a side perspective view showing a plurality of beams produced as a result of shining a laser beam through a linear diffraction grating.

FIG. 15 is a side perspective view showing an incident laser beam 120 being directed through a single axis diffraction grating 1000. The single axis diffraction grating 1000 causes the beam 120 to produce a plurality of diffracted laser beams 1024 which when projected on a flat surface such as a wall produce a plurality of dots 1025 arranged in a line along that surface. It has been observed, with a particular type of laser source used that a diffraction grating of 1000 lines per millimeter (1/mm), three dots were formed.

Figure 16:
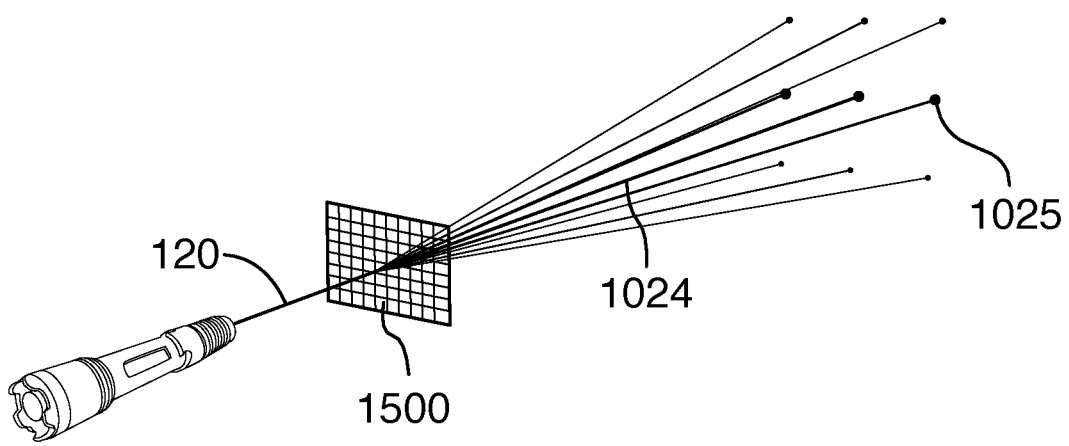
FIG. 16 is a side perspective view showing a plurality of beams produced as a result of shining a laser beam through a double axis diffraction grating.

FIG. 16 is a side perspective view showing an incident laser beam 120 being directed through a double axis diffraction grating 1500. The double axis diffraction grating 1500 causes the beam 120 to produce a plurality of diffracted laser beams 1024 which when projected on a flat surface such as a wall produce a plurality of dots 1025 arranged in a matrix shape on that surface.

Figure 17:
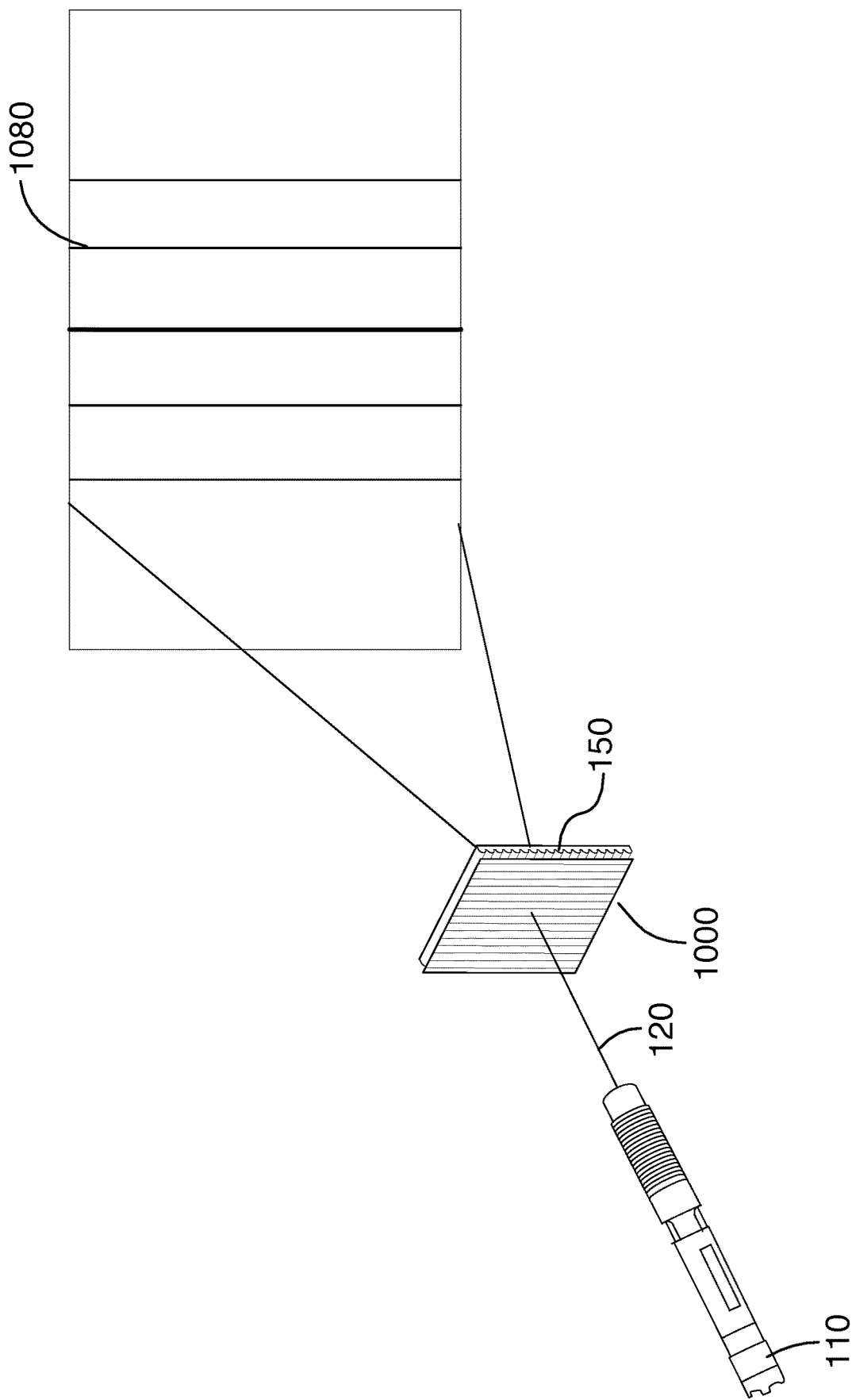
FIG. 17 is a side perspective view showing system of producing a plurality of beam patterns by shining a laser beam through a linear diffraction grating with vertical lines, and a linear lenticular sheet with horizontally oriented lenticular lenses.

Turning back to FIG. 1 when an incident laser light beam 120 was aimed generally perpendicularly to a linear lenticular sheet 150 in which the lenticular elements 155 were horizontally oriented, the resulting pattern was a beam formed as a triangle and which projected as a vertical line 130 on a flat surface. Each vertical line 130 is in fact comprised of hundreds of dots that are closely spaced. If the plurality of laser beams 1024 from FIG. 15 are passed through a lenticular sheet 150 such as that of FIG. 1 then each one of the diffracted laser beams 1024 of FIG. 15 would produce a line such as line 130 of FIG. 1. With reference to FIG. 17, a laser source 110 directs an incident laser beam 120 through a linear diffraction grating 1000 oriented such that the diffraction lines are vertical, followed by a linear lenticular sheet 150 placed behind and abutting the diffraction grating 1000, with the lenticular lenses oriented horizontally. The resulting pattern is a plurality of triangular vertical planes projecting as vertical lines 1080. A close examination of the vertical lines shows that each line is formed of a hundreds of closely spaced points. The number of vertical lines depends on the pattern density of the diffraction grating. Accordingly, the number of vertical lines projected may be increased.

Figure 18:
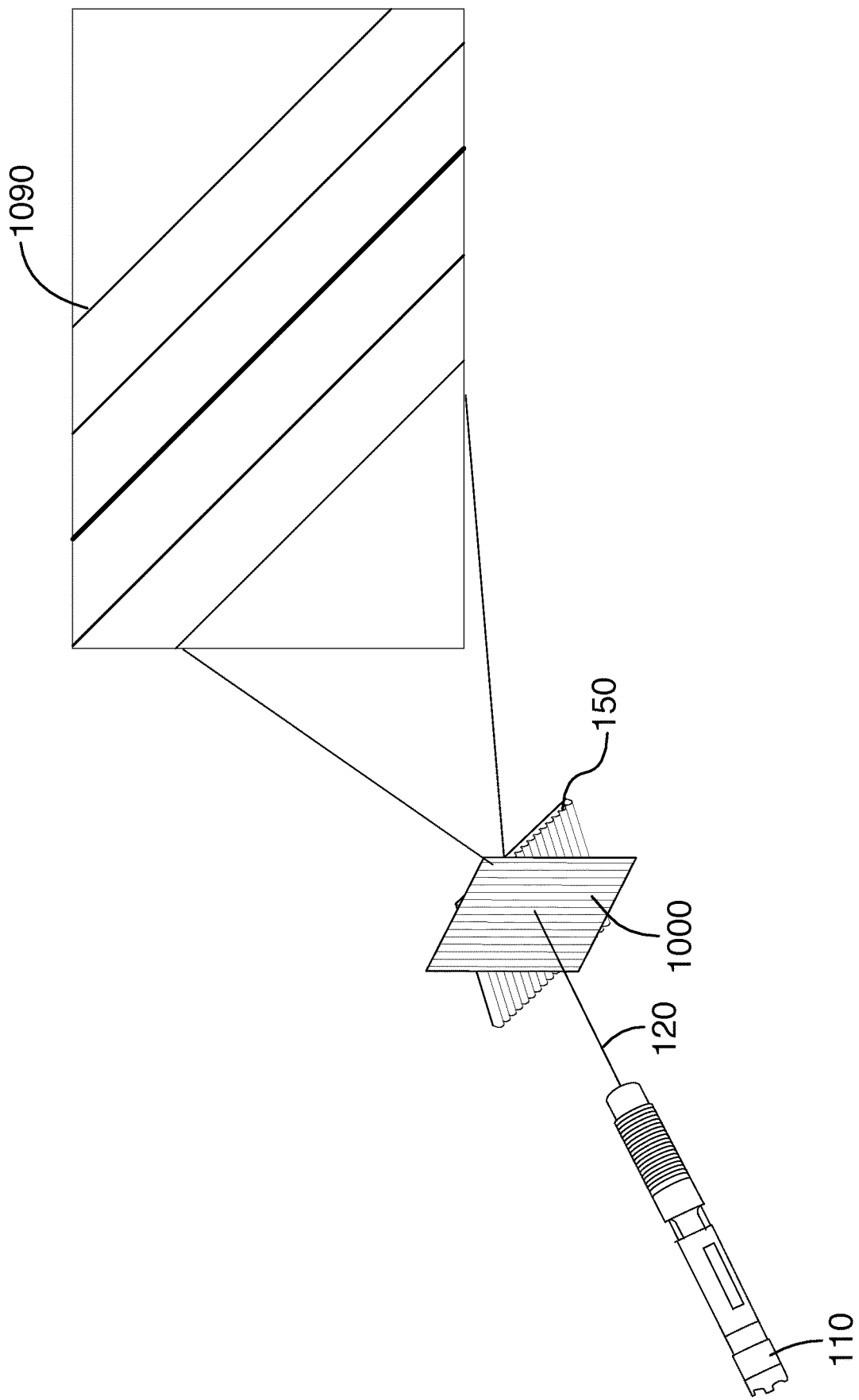
FIG. 18 is a side perspective view showing a system similar to that of FIG. 17 but wherein the lenticular sheet has been rotated by approximately 45 degrees with respect to the linear diffraction grating.

With respect to FIG. 18, if the lenticular lens sheet 150 is rotated such that it is angled with respect to the diffraction grating 1000 then the points projected by the diffraction grating no longer line up vertically and each one of them produces a line when passed through the linear lenticular sheet. The resulting pattern is the same number of diagonal triangular laser planes projecting as diagonal lines 1090 and which are closely spaced. Again, each one of the diagonal lines 1090 is comprised of hundreds of points.

Figure 19:
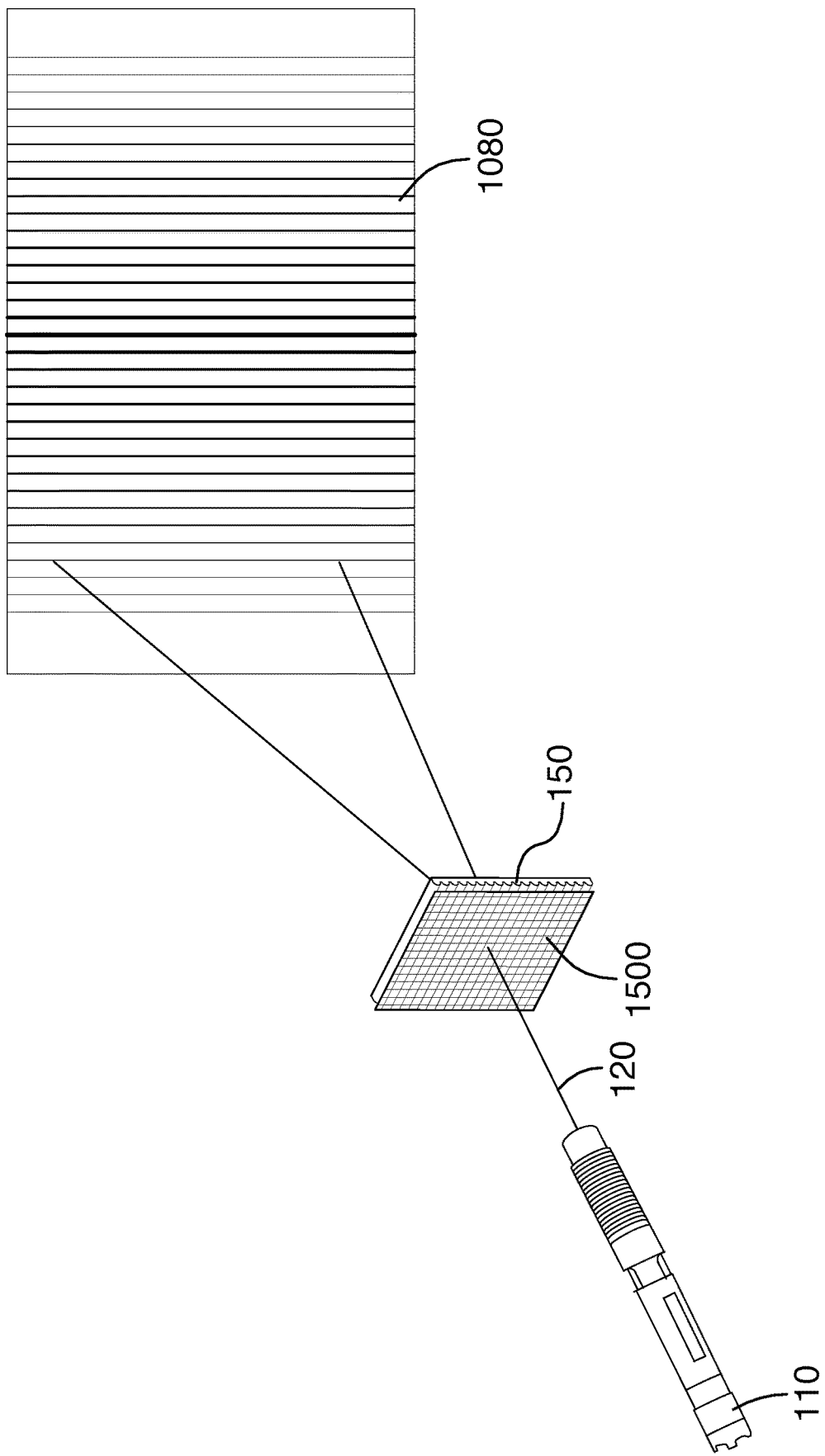
FIG. 19 is a side perspective view showing system of producing a plurality of beam patterns by shining a laser beam through a double-axis diffraction grating, and a linear lenticular sheet with horizontally oriented lenticular lenses.

The diffraction grating used in FIG. 19 is a double-axis diffraction grating 1500, in accordance with an embodiment of the present disclosure. As discussed earlier with respect to FIG. 16, a matrix of laser beams projecting as a matrix of laser dots is formed when an incident laser beam 120 is projected through a double-axis diffraction grating 1500. For example, if a double axis diffraction grating had a pattern density of 13,500 lines per inch, a matrix pattern of 13×13 dots has been observed to be projected by the diffracted laser beams. If a lenticular sheet 150 with a plurality of lenses is placed in the path of the diffracted laser beams 1024, then each beam produces a line as shown earlier. If the lenticular sheet is placed such that the lenticular lenses are horizontally oriented, then many of the lines 1080 line up and one sees a few substantially bright lines.

Figure 20:
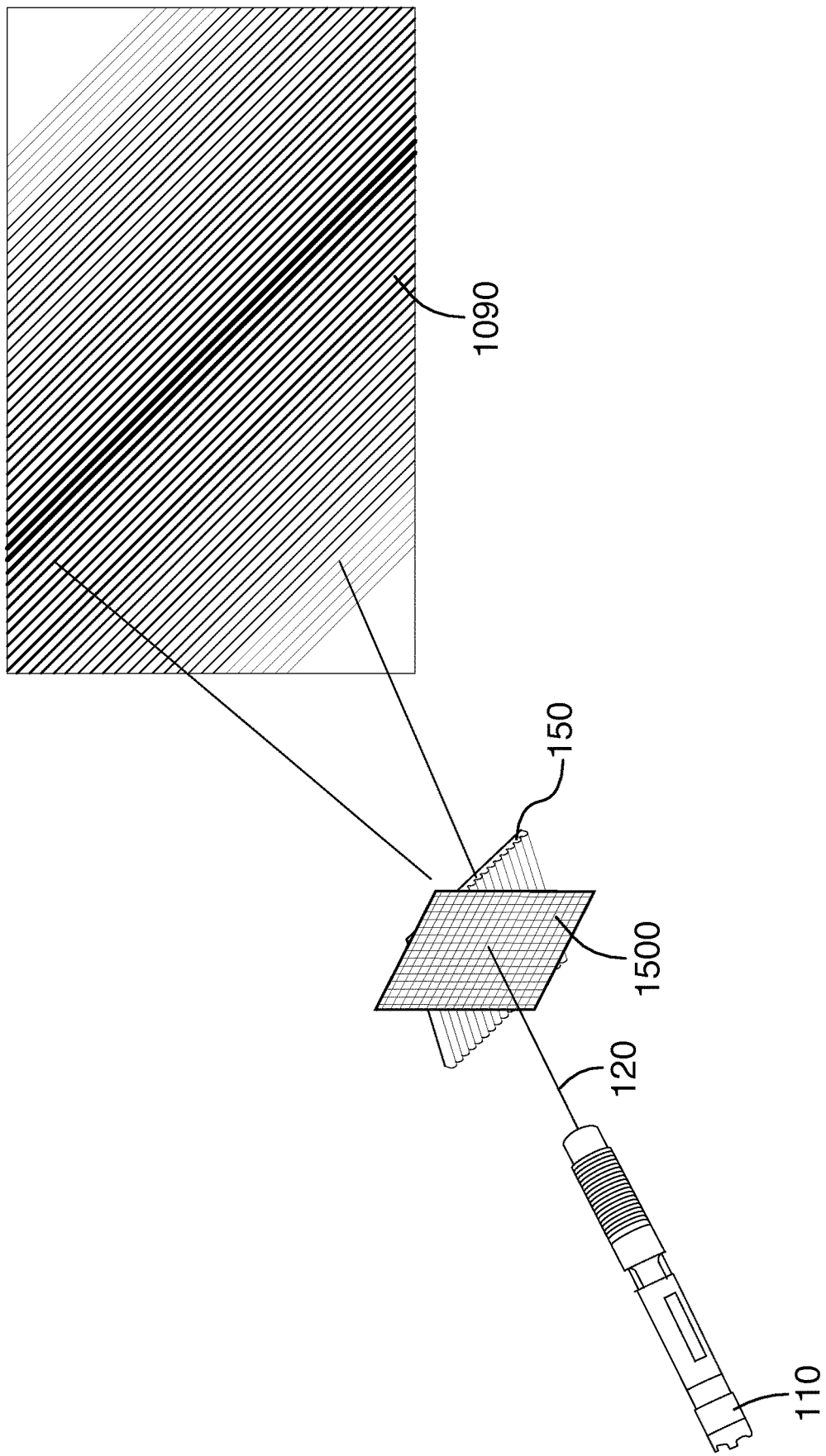
FIG. 20 is a side perspective view showing a system similar to that of FIG. 19 but wherein the lenticular sheet has been rotated by approximately 45 degrees with respect to the double-axis diffraction grating.

In FIG. 20, the lenticular sheet 150 is rotated by an angle relative to the double-axis diffraction grating 1500. Accordingly, the matrix of dots produced by the diffraction grating is now oriented diagonally to the lenticular sheet 150. The resulting pattern is the plurality of lines 1090, which are diagonal. The lines 1090 are more than lines 1080 and are more closely spaced. Each of the lines 1090 is comprised of hundreds of dots.

It has been observed that adding more diffraction grating sheets with different pattern densities in the path of the incident laser beams, produces more diffracted beams forming dots. Passing the diffracted beams through a lenticular sheet, as discussed, converts each dot into a line, with each line made up of hundreds or even thousands of dots. An object coming into the path of the plurality of beams is in the path of thousands of laser beams and can be detected with good resolution using LiDAR systems. Additionally, a LIDAR system utilizing thousands of laser beams in the form of a matrix is very sensitive to even small objects. The thousands of laser beams are closely spaced even at farther distances, which may avert the need for performing sweeps similar to those performed with laser cones. The limiting factor of the number of diffraction gratings to be used is the amount of laser light that manages to go through and its intensity. A stronger laser may still shine enough power to be usable even with a number of diffraction gratings, while a weaker laser may only be used in conjunction with a few diffraction gratings. The application of the LIDAR system may dictate the strength of the laser used, and accordingly the number of diffraction gratings, their pattern density, and their angle in relation to each other and in respect to the lenticular lens. Additionally, the distance to the Objects to be detected may dictate the number of gratings to use. For example, for objects that are not far enough, a few number of gratings may be used as the resulting lines and dots are still closely spaced at a near distance. However, for detecting objects that are far away, more gratings producing, with the lenticular sheet, more beams that are closely spaced would be desirable. A stronger laser is needed in that case as more gratings reduce the amount of laser light passing through which affects the ability to detect an object using LIDAR.

Figure 21:
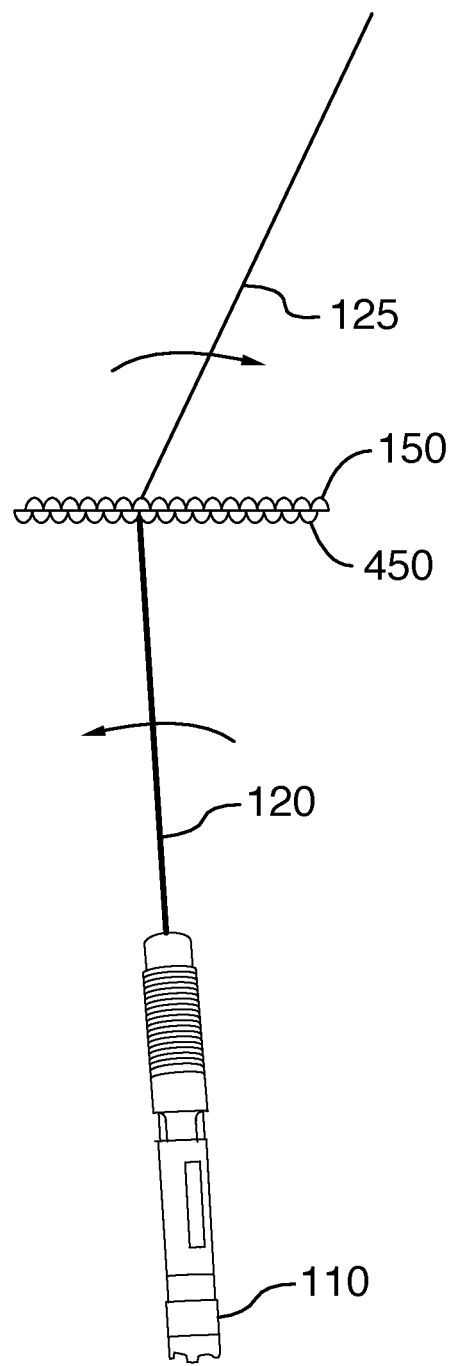
FIG. 21 is a side view showing a system of two back-to-back linear lenticular lenses having a horizontal offset between the lenses thereof, used to divert a laser beam.

FIG. 21 shows a system of diverting a laser beam by using two back-to-back linear lenticular sheets 150 and 450, with an offset interference pattern therebetween. As shown the individual lenticular lenses of sheet 150 are laterally offset from those of sheet 450 in the horizontal direction. An incident laser beam 120 aimed at lenticular sheet 450 is diverted as it exits the lenticular sheet 150 as diverted beam 125. The interference pattern therefore deviates the laser beam. This is beneficial since in modern warfare laser designators are often used to mark a target. This is done for laser guided bombs, missiles, and precision artillery munitions. By deviating the laser designator, there is a chance that the weapon will miss a vulnerable point of the target, such as a battle tank, which often requires a direct hit in a particular location to incapacitate it.

Lasers are also increasingly being used by ground forces to aim their weapons at the enemy. These lasers can operate in frequencies outside of the visible spectrum, and can be seen through night vision scopes or goggles. The material used in FIG. 21 works to deviate lasers not only in the visible spectrum, but also those in the UV (Ultraviolet), NIR (Near Infrared) and SWIR (Short Wave Infrared) and potentially beyond this range Deviating the pinpoint accuracy of a laser can also result in the soldier aiming at the wrong place and consistently missing the target without understanding why they cannot hit it. With the disruptive element of the interference concealing the target's status, the enemy may not even be aware that they completely missed the target, assuming they hit it. This may cause the enemy to change their offensive or defensive posture or position to allow the concealed target behind our material, to easily locate and identify the combatant and target that adversary while they are most vulnerable. With the system of FIG. 21, moving a laser beam to the right causes it to deflect to the left, and vice versa. This is depicted by the arrows, which show that the deflected laser beam 125 moves in the opposite direction as that of the incident laser beam 120. An observer aiming at a target may notice that the projected laser dot on the target is moving in the opposite direction as that of the direction in which the laser source is being moved. Accordingly, the observer may suspect that some form of camouflage material is present in front of the target, and conclude that the target will not be hit precisely when ammunition is fired at the target using the observed dot.

Figure 22:
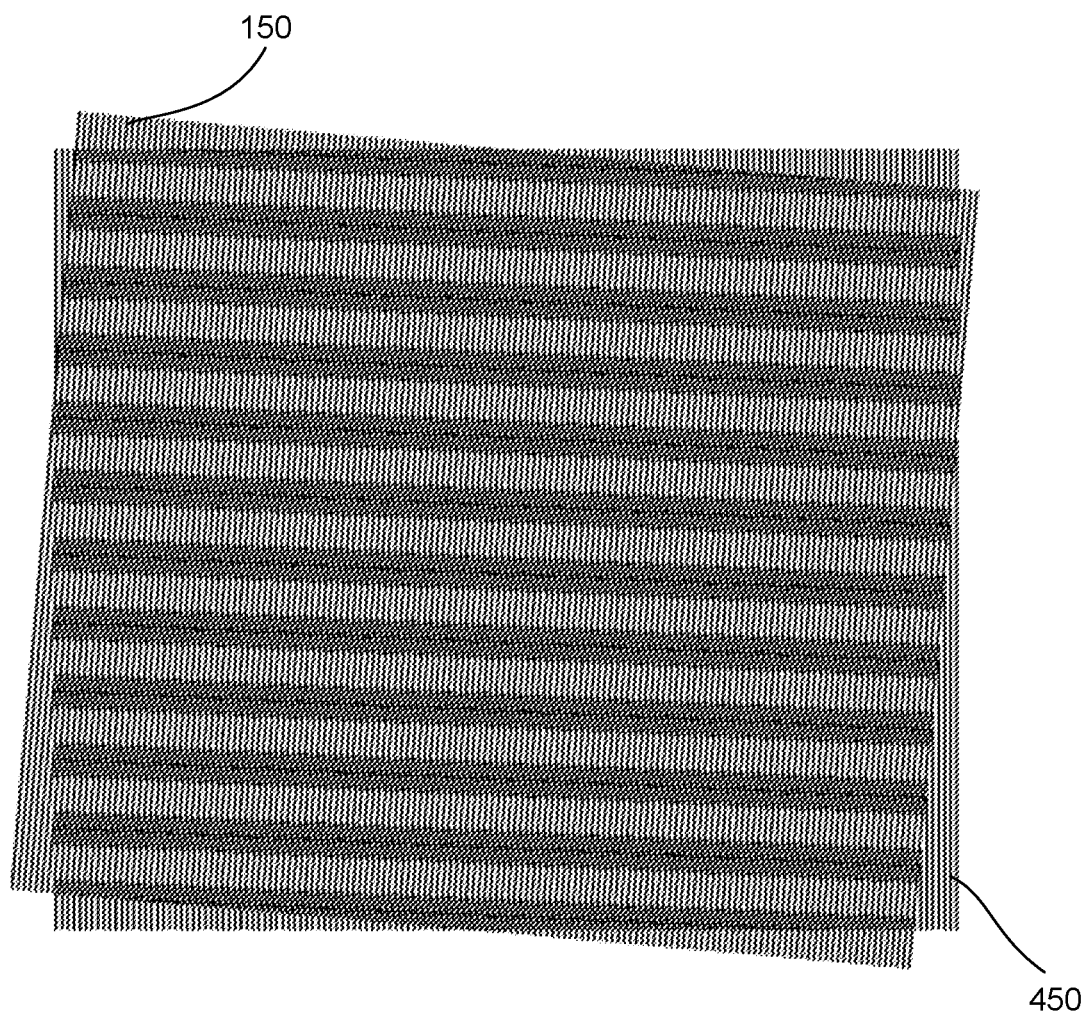
FIG. 22 is a top view showing a system of two back-to-back linear lenticular lenses having an angular offset between the lenses thereof.

FIG. 22 depicts an alternate arrangement for two back-to-back linear lenticular sheets 150 and 450. In this arrangement, the individual lenticular lenses of sheet 150 are angled to those of sheet 450 in the horizontal direction, which produces an interference pattern that deviates an incident laser beam passing therethrough.

Figure 23:
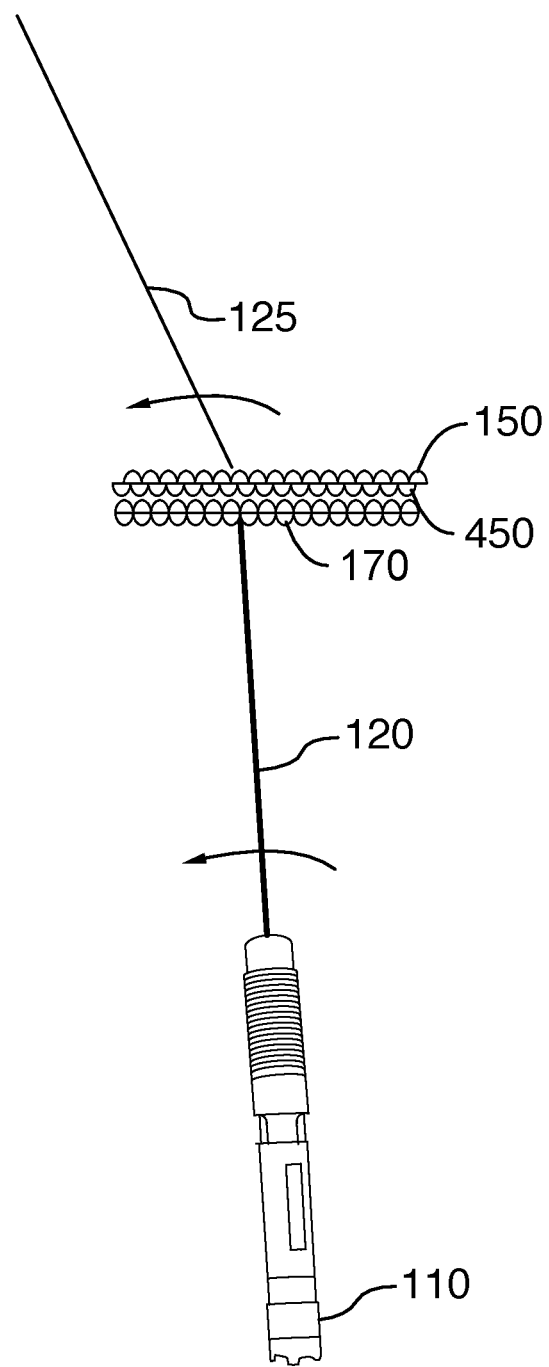
FIG. 23 is a side view showing a system of two back-to-back linear lenticular lenses having aligned lenticular lenses with one another, used to divert a laser beam

FIG. 23 shows a system of diverting a laser beam by using two back-to-back linear lenticular sheets 150 and 450, with an offset interference pattern therebetween, and an additional double-sided lenticular sheet 170. As shown the individual lenticular lenses of sheet 150 are offset from those of sheet 450 in the horizontal direction. The double-sided lenticular sheet 170 is shown positioned between the laser source and lenticular sheets 450 and 150, however lenticular sheet 170 may also be positioned behind the lenticular 150 and 450. An incident laser beam 120 aimed at lenticular sheet 450 exits the lenticular sheet 150 as a diverted beam as was the case in FIG. 21, however that diverted beam now passes through double-sided lenticular sheet 170. In this case, the beam is diverted by when the laser source is moved in a particular direction, the diverted beam 125 moves in the same direction. Advantageously, the diverted beam does not project on the intended target, but at the same time an observer may not suspect that the beam is being diverted since as they move the laser source, the projected laser dot appears to move in the same direction. Accordingly, the observer may be under the impression that the target has been hit when ammunition is fired in the direction of the observed projected dot.

While the lenticular lenses have been drawn with substantially the same dimensions, it will be apparent to those of skill in the art, that different lenticular sheets with different angles or lenses-per-inch (LPI) may be used interchangeably without affecting the way in which the invention works.

While the lenticular sheets used in the exemplary embodiments comprised longitudinal lenticular sheets, other equivalent refractive-reflective material may be usable. For example, prism lenses, dove prism lenses, and dove prism lenses split in the middle may be used.

For all systems described herein that use lenticular lenses, and/or diffraction grating, the surfaces thereof may be coated or manufactured with protective elements that may counter some or all of the following including but not limited to: fog, water, fire, dirt, dust, scratches, heat, cold, and ultraviolet radiation.

Having thus described, by way of example only, embodiments of the present invention, it is to be understood that the invention as defined by the appended claims is not to be limited by particular details set forth in the above description of exemplary embodiments as many variations and permutations are possible without departing from the scope of the claims.

What is claimed is:

1. A system for diverting a laser beam, comprising:
  a laser source emitting an incident laser beam comprising a plurality of rays projecting as a dot;
  a lenticular sheet having a lens side comprising a plurality of parallel longitudinal lenticular lenses and a smooth side opposite the lens side;
  at least one diffraction grating having at least one dual-axis diffraction grating oriented such that a first plurality of lines thereof are oriented at a non-zero orientation angle relative to a second plurality of lines thereof;
  wherein:
    the laser source is aimed towards the lens side of the lenticular sheet such that the incident laser beam falls directly onto at least one of the plurality of parallel longitudinal lenticular lenses,
    a first portion of the plurality of rays of the incident laser beam is diverted by refraction through the lenticular sheet exiting at the smooth side to form a refracted beam of a first particular shape, and
    a second portion of the plurality of rays of the incident laser beam is reflected by a surface of the at least one of the plurality of parallel longitudinal lenticular lenses to form a reflected beam of a second particular shape.

2. The system of claim 1, wherein the laser source is aimed so that the first incident laser beam falls perpendicularly onto the at least one of the plurality of parallel longitudinal lenticular lenses, the first portion of the incident the laser beam diverted by refraction represents a majority of the plurality of rays of the incident laser beam, and the refracted beam of the first particular shape is in the form of a triangular plane beam projected as a straight line.

3. The system of claim 2, wherein the lenticular sheet is placed in an upright position such that the plurality of parallel longitudinal lenses are oriented horizontally, the triangular plane beam is vertically oriented, and the projected straight line is vertical.

4. The system of claim 2, wherein the lenticular sheet is placed in an upright position such that the plurality of parallel longitudinal lenticular lenses are oriented vertically, the triangular plane beam is horizontally oriented, and the projected straight line is horizontal.

5. The system of claim 1, wherein the laser source is aimed so that the incident laser beam falls at an angle of incidence to a perpendicular direction onto the at least one of the plurality of parallel longitudinal lenticular lenses such that the first portion of the plurality of rays of the first incident laser beam diverted by refraction represents a majority of the plurality of rays of the first incident laser beam, the first incident laser beam is in the same plane as a horizontal plane passing through the at least one of the plurality of parallel longitudinal lenticular lenses, and the refracted beam of a particular shape is in the form of a curved plane projected as an arc.

6. The system of claim 1, wherein the laser source is aimed so that the first incident laser beam falls at an incident angle off of a perpendicular direction onto the at least one of the plurality of parallel longitudinal lenticular lenses such that the first and second portions together form a cone projecting to a circle.

7. The system of claim 1, wherein the lens side of the lenticular sheet is coated with reflective material such that the second portion of the plurality of rays reflected by the surface of the at least one of the plurality of longitudinal lenticular lenses comprises all of the plurality of rays of the incident laser beam.

8. A method of claim 1, wherein an anti-reflective layer or coating is disposed on at least one of the lens side and the smooth side of the lenticular sheet for reducing the second portion of the plurality of rays of the incident laser beam which is reflected by the surface of the at least one of the plurality of longitudinal lenticular lenses.

9. The system of claim 1, wherein the at least one diffraction grating is positioned between the laser source and the lenticular sheet such that the incident laser beam passes through the diffraction grating before passing through the lenticular sheet.

10. The system of claim 1, wherein the at least one diffraction grating is positioned behind the lenticular sheet such that the incident laser beam passes through the diffraction grating after passing through the lenticular sheet.

11. The system of claim 9 or claim 10, wherein the lenticular sheet is placed in an upright position such that the plurality of parallel longitudinal lenses are oriented horizontally, and the at least one diffraction grating comprises at least one linear diffraction grating oriented such that a plurality of lines thereof are vertically oriented.

12. The system of claim 9 or claim 10, wherein the lenticular sheet is placed in an upright position such that the plurality of parallel longitudinal lenses are oriented at an angle to the horizontal plane, and the at least one diffraction grating comprises at least one linear diffraction grating oriented such that a plurality of lines thereof are vertically oriented.

13. The system of claim 9 or claim 10, wherein the lenticular sheet is placed in an upright position such that the plurality of parallel longitudinal lenses are oriented horizontally, and the at least one dual-axis diffraction grating is oriented such that the first plurality of lines thereof are vertically oriented, and the second plurality of lines thereof are horizontally oriented.

14. The system of claim 9 or claim 10, wherein the lenticular sheet is placed in an upright position such that the plurality of parallel longitudinal lenses are oriented at an angle to the horizontal plane, and the at least one dual-axis diffraction grating is oriented such that the first plurality of lines thereof are vertically oriented, and the second plurality of lines thereof are horizontally oriented.

15. The system of claim 1, wherein the at least one dual-axis diffraction grating comprises a first linear diffraction grating having the first plurality of lines and a second linear diffraction grating having the second plurality of lines.

16. The system of claim 1, wherein the non-zero orientation angle is 90 degrees.

\* \* \* \* \*